United States Patent
Shahriar et al.

(10) Patent No.: US 10,873,502 B2
(45) Date of Patent: Dec. 22, 2020

(54) SYSTEM AND METHOD FOR JOINT EMBEDDING AND BACKUP PROVISIONING IN VIRTUAL NETWORKS

(71) Applicants: Nashid Shahriar, Waterloo (CA); Aimal Khan, Waterloo (CA); Reaz Ahmed, Waterloo (CA); Jeebak Mitra, Ottawa (CA); Shihabur Rahman Chowdhury, Kitchener (CA); Raouf Boutaba, Waterloo (CA)

(72) Inventors: Nashid Shahriar, Waterloo (CA); Aimal Khan, Waterloo (CA); Reaz Ahmed, Waterloo (CA); Jeebak Mitra, Ottawa (CA); Shihabur Rahman Chowdhury, Kitchener (CA); Raouf Boutaba, Waterloo (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 302 days.

(21) Appl. No.: 15/650,354

(22) Filed: Jul. 14, 2017

(65) Prior Publication Data
US 2018/0034696 A1    Feb. 1, 2018

Related U.S. Application Data

(60) Provisional application No. 62/368,936, filed on Jul. 29, 2016.

(51) Int. Cl.
G06F 15/173    (2006.01)
H04L 12/24    (2006.01)
(Continued)

(52) U.S. Cl.
CPC ...... H04L 41/0836 (2013.01); G06F 9/45558 (2013.01); G06F 17/11 (2013.01);
(Continued)

(58) Field of Classification Search
CPC . H04L 41/0896; H04L 65/80; H04L 67/1008; G06F 17/11; G06F 2009/4557; G06F 2009/45595
(Continued)

(56) References Cited

U.S. PATENT DOCUMENTS

| | | | |
|---|---|---|---|
| 2002/0187770 A1 | 12/2002 | Grover et al. | |
| 2010/0157807 A1* | 6/2010 | Csaszar | H04L 45/00 370/237 |

(Continued)

FOREIGN PATENT DOCUMENTS

| | | |
|---|---|---|
| CA | 2480094 A1 | 11/2003 |
| CA | 2904634 A1 | 10/2014 |

OTHER PUBLICATIONS

Burkard et al., The Quadratic Assignment Problem., 2013, Springer Science & Business Media. vol. 1, p. 1-71. (Year: 2013).*
P. Demeester, et al., "Resilience in Multilayer Networks," IEEE Comm. Magazine, Aug. 1999, pp. 70-76, vol. 37, No. 8.
R. Burkard, et al, The Quadratic Assignment Problem: Theory and Algorithms. Springer Science & Business Media, 2013, pp. 1-71, vol. 1.
(Continued)

*Primary Examiner* — Wing F Chan
*Assistant Examiner* — Andrew Woo

(57) ABSTRACT

Network Virtualization can be used to map a virtual network (VN) on a substrate network (SN) while accounting for possible substrate failures, known as the Survivable Virtual Network Embedding (SVNE) problem. The VN can be equipped with sufficient spare backup capacity to sustain the Quality of Service during substrate failures, and the resulting VN may be equipped accordingly. The present application discloses jointly optimizing spare backup capacity allocation and embedding a VN to provide full bandwidth in the presence of a single substrate link failure. A solution may be formulated as a Quadratic Integer Program that can be further transformed into an Integer Linear Program, or as a heuristic.

22 Claims, 13 Drawing Sheets

(51) Int. Cl.
*G06F 9/455* (2018.01)
*G06F 17/11* (2006.01)

(52) U.S. Cl.
CPC ...... *H04L 41/0663* (2013.01); *H04L 41/0896* (2013.01); *G06F 2009/4557* (2013.01); *G06F 2009/45595* (2013.01); *H04L 41/12* (2013.01)

(58) Field of Classification Search
USPC .................................................. 709/223, 226
See application file for complete search history.

(56) References Cited

U.S. PATENT DOCUMENTS

| 2011/0225277 | A1 | 9/2011 | Freimuth et al. | |
|---|---|---|---|---|
| 2011/0246647 | A1* | 10/2011 | Marquezan | H04L 43/00 709/224 |
| 2012/0014284 | A1 | 1/2012 | Ranganathan et al. | |
| 2017/0078152 | A1* | 3/2017 | Ahmed | H04L 41/12 |

OTHER PUBLICATIONS

. Oral, et al, "A Linearization Procedure for Quadratic and Cubic Mixed-Integer Problems," Operations Research, Operations Research Society of America, Jan.-Feb. 1992, pp. S109-S116, vol. 40, No. 1—supplement-1, USA.

R. Asthana, et al., "p-Cycles: An Overview," IEEE Comm. Surveys & Tutorials, 2010, pp. 97-111, vol. 12, No. 1.

E. W. Dijkstra, "A Note on Two Problems in Connexion with Graphs," Numerische Mathematik, 1959, pp. 269-271, vol. 1, No. 1.

N. Shahriar et al., "Joint Backup Capacity Allocation and Embedding for Survivable Virtual Networks," In Proceedings of IFIP Networking 2017.

W. Wang et al., "First Demonstration of Virtual Transport Network Services With Multi-layer Protection Schemes Over Flexi-Grid Optical Networks," IEEE Communications Letters, Feb. 2016, pp. 260-263, vol. 20, No. 2.

* cited by examiner

Algorithm 1: Embed VN with Protection

1. function *VNEmbedding(G, $\hat{G}$, C, $\sigma$)*
2.     $D \leftarrow \{d_1, d_2, \ldots d_{|E|}\}$ // Set of all SRGs
3.     $\forall \hat{u} \in \hat{V} : nmap_{\hat{u}} \leftarrow NIL$
4.     $\forall (\hat{u}, \hat{v}) \in \hat{E} : S^{est}_{\hat{u}\hat{v}} \leftarrow 0, \Lambda_{\hat{u}\hat{v}} \leftarrow \sigma, SRG_{\hat{u}\hat{v}} \leftarrow d_1,$
        $emap_{\hat{u}\hat{v}} \leftarrow \phi, backup_{\hat{u}\hat{v}} \leftarrow \phi$
5.     $\hat{\mathcal{V}} \leftarrow$ Sort $\hat{u} \in \hat{V}$ in decreasing order of $|\mathcal{N}(\hat{u})|$
6.     foreach $\hat{u} \in \hat{\mathcal{V}}$ do
7.        foreach $\hat{v} \in \mathcal{N}(\hat{u})$ do
8.           $backup_{\hat{u}\hat{v}} \leftarrow$ GetBackup$(\hat{G}, (\hat{u}, \hat{v}), \Lambda, emap)$
9.           foreach $(\hat{x}, \hat{y}) \in backup_{\hat{u}\hat{v}}$ do
10.             $S^{est}_{\hat{x}\hat{y}} \leftarrow \max(S^{est}_{\hat{x}\hat{y}}, b_{\hat{u}\hat{v}})$
11.             if $SRG_{\hat{u}\hat{v}} = SRG_{\hat{x}\hat{y}}$ then
12.                Find $d_j \in D$ s.t.
                  $SRG_{\hat{u}\hat{v}} \neq d_j, \forall (\hat{u}, \hat{v}) \in \hat{E}$
13.                $SRG_{\hat{u}\hat{v}} \leftarrow d_j$
14.             $\mathcal{H}_{\hat{x}\hat{y}} \leftarrow \{(\hat{a}, \hat{b}) \in \hat{E} | (\hat{x}, \hat{y}) \in backup_{\hat{a}\hat{b}}\}$
            foreach $(\hat{a}, \hat{b}) \in \mathcal{H}_{\hat{x}\hat{y}}$ do
15.                if $SRG_{\hat{u}\hat{v}} = SRG_{\hat{a}\hat{b}}$ then
16.                    Find $d_j \in D$ s.t.
                      $SRG_{\hat{u}\hat{v}} \neq d_j, \forall (\hat{u}, \hat{v}) \in \hat{E}$
17.                    $SRG_{\hat{u}\hat{v}} \leftarrow d_j$
18.        $best_{\hat{u}} \leftarrow NIL, Q^{best}_{\hat{u}} \leftarrow \phi, c_{best} \leftarrow \infty$
19.        foreach $l \in L(\hat{u})$ do
20.           foreach $\hat{v} \in \mathcal{N}(\hat{u})$ do
21.             $W \leftarrow C$
22.             $\forall (m, n) \in \{(u, v) \in E | SRG_{\hat{x}\hat{y}} \neq$
              $SRG_{\hat{u}\hat{v}} \wedge (u, v) \in emap_{\hat{x}\hat{y}}, \forall (\hat{x}, \hat{y}) \in \hat{E}\}:$
              $W_{mn} \leftarrow \infty$
23.             if $nmap_{\hat{v}} \neq NIL$ then
24.                $Q_{\hat{u}\hat{v}} \leftarrow$ CWSP$(G, l, nmap_{\hat{v}}, b_{\hat{u}\hat{v}}, W)$
25.             else $Q_{\hat{u}\hat{v}} \leftarrow$
               $\min_{\forall m \in L(\hat{v})} \{$CWSP$(G, l, m, b_{\hat{u}\hat{v}}, W)\}$
26.           if $\exists \hat{v} \in \mathcal{N}(\hat{u}) : Q_{\hat{u}\hat{v}} = \phi$ then $c \leftarrow \infty$
27.           else $c \leftarrow \sum_{\forall \hat{v} \in \mathcal{N}(\hat{u})} Q_{\hat{u}\hat{v}}$
28.           if $c < c_{best}$ then
29.              $best_{\hat{u}} \leftarrow l, Q^{best}_{\hat{u}} \leftarrow Q_{\hat{u}}, c_{best} \leftarrow c$
30.        if $best_{\hat{u}} = NIL$ then return $\{\phi, \phi, \phi, \phi\}$
31.        $nmap_{\hat{u}} \leftarrow best_{\hat{u}}$
32.        foreach $\hat{v} \in \mathcal{N}(\hat{u})$ and $nmap_{\hat{v}} \neq NIL$ do
33.           $emap_{\hat{u}\hat{v}} \leftarrow Q^{best}_{\hat{u}\hat{v}}, \Lambda_{\hat{u}\hat{v}} \leftarrow Cost(Q^{best}_{\hat{u}\hat{v}})$
34.     $\{backup, S\} \leftarrow$ UpdateBackup$(\hat{G}, backup, SRG)$
35.     return $\{nmap, emap, backup, S\}$

FIG. 4A

Algorithm 2: Compute Backup Path of a VLink

1  function $GetBackup(\hat{G}, (\hat{u}, \hat{v}), \Sigma, emap)$
2      foreach $(\hat{x}, \hat{y}) \in \hat{E}$ do
3         if $S^{est}_{\hat{x}\hat{y}} \geq b_{\hat{u}\hat{v}}$ then $Weight^{est}_{\hat{x}\hat{y}} \leftarrow 1$
4         else if $emap_{\hat{x}\hat{y}} = \phi$ or $\min_{(u,v) \in Q_{\hat{x}\hat{y}}} b^{residual}_{uv} \geq b_{\hat{u}\hat{v}}$
        then $Weight^{est}_{\hat{x}\hat{y}} \leftarrow (b_{\hat{u}\hat{v}} - S^{est}_{\hat{x}\hat{y}}) \times \Sigma_{\hat{x}\hat{y}}$
5
6         else $Weight^{est}_{\hat{x}\hat{y}} \leftarrow \infty$
7      $Weight^{est}_{\hat{u}\hat{v}} \leftarrow \infty$
8      return $CWSP(\hat{G}, \hat{u}, \hat{v}, b_{\hat{u}\hat{v}}, Weight^{est})$

FIG. 4B

Algorithm 3: Reconfigure Backup Paths of VLink

1  function $UpdateBackup(\hat{G}, backup, SRG)$
2      $\forall (\hat{u}, \hat{v}) \in \hat{E} : S_{\hat{u}\hat{v}} \leftarrow 0$
3      $\hat{R} \leftarrow$ longest cycle in $\hat{G}$ such that no VLink pair in $\hat{R}$ shares an SLink on their mapped SPaths
4      $\forall (\hat{x}, \hat{y}) \in \hat{R} : S_{\hat{x}\hat{y}} \leftarrow \max_{\forall (\hat{u}, \hat{v}) \in \hat{R}} \{b_{\hat{u}\hat{v}}\}$
5      foreach $(\hat{u}, \hat{v}) \in \hat{E}$ do
6         foreach $(\hat{x}, \hat{y}) \in \hat{E} \setminus \{(\hat{u}, \hat{v})\}$ do
7            if $SRG_{\hat{u}\hat{v}} = SRG_{\hat{x}\hat{y}}$ then $Weight_{\hat{x}\hat{y}} \leftarrow \infty$
8            else if $S_{\hat{x}\hat{y}} \geq b_{\hat{u}\hat{v}}$ then $Weight_{\hat{x}\hat{y}} \leftarrow 1$
9            else $Weight_{\hat{x}\hat{y}} \leftarrow (b_{\hat{u}\hat{v}} - S_{\hat{x}\hat{y}})$
10        $Weight_{\hat{u}\hat{v}} \leftarrow \infty$
11        $backup_{\hat{u}\hat{v}} \leftarrow CWSP(\hat{G}, \hat{u}, \hat{v}, b_{\hat{u}\hat{v}}, Weight)$
12        $\forall (\hat{x}, \hat{y}) \in backup_{\hat{u}\hat{v}} : S_{\hat{x}\hat{y}} \leftarrow \max(S_{\hat{x}\hat{y}}, b_{\hat{u}\hat{v}})$
13     return $\{backup, S\}$

FIG. 4C

SYSTEM AND METHOD FOR JOINT EMBEDDING AND BACKUP PROVISIONING IN VIRTUAL NETWORKS

RELATED APPLICATIONS

The present application claims priority to U.S. Provisional Patent Application No. 62/368,936, filed on Jul. 29, 2016, the entirety of which is incorporated herein by reference.

FIELD

The present disclosure relates generally to network virtualization.

BACKGROUND

Network infrastructure providers (InPs), such as data center network operators, Internet service providers, and transport network operators are leveraging Network Virtualization (NV) to offer slices of their networks to service providers (SPs). Virtualization of the network allows multiple virtual networks to be embedded onto a single underlying physical network infrastructure. The embedding of virtual networks onto a physical network can increase the resource management requirements of the physical network components. Typical objectives of virtual network embedding include maximizing the number of embedded virtual networks, minimizing the bandwidth provisioning cost on the physical network, etc. However, the benefits from network virtualization come with additional resource management challenges, such as efficiently mapping the virtual nodes and links of a virtual network request onto substrate nodes and paths, respectively.

Survivable virtual network embedding attempts to maintain the embedded virtual networks in the event of failures in the underlying physical network infrastructure. Providing survivable virtual network embedding may use a reactive approach that restores embedded virtual networks in response to failures in the underlying physical network infrastructure. Proactive survivable virtual network embedding approaches may proactively provision the virtual network, or portions of the virtual network, onto redundant or backup physical infrastructure. However, such proactive approaches typically rely on over provisioning of the physical network resources, which can result in increased capital expenditure.

SUMMARY

According to an aspect of the application there is provided a method for use in network virtualization that involves jointly optimizing provisioning of backup bandwidth capacity for a virtual network and embedding of the virtual network on a substrate network to reduce consumption of substrate network resources, the backup bandwidth capacity allocated within the virtual network being used upon occurrence of a failure in the substrate network. The method further involves embedding the virtual network and the backup bandwidth capacity within the virtual network.

In some embodiments, jointly optimizing the provisioning of the backup bandwidth capacity for the virtual network and embedding of the virtual network on the substrate network comprises formulating a joint optimization solution as a Quadratic Integer Program (QIP).

In some embodiments, formulating the joint optimization solution as the Quadratic Integer Program comprises formulating a solution to minimize:

$$\sum_{\forall (\hat{u},\hat{v}) \in \hat{E}} \sum_{\forall (u,v) \in E} x_{uv}^{\hat{u}\hat{v}} \times C_{uv} \times (b_{\hat{u}\hat{v}} + S_{\hat{u}\hat{v}})$$

wherein $\hat{u}$ and $\hat{v}$ are first and second virtual nodes in the virtual network, u and v are first and second nodes in the substrate network, $x_{uv}^{\hat{u}\hat{v}}$ is a mapping between a virtual link VLink$(\hat{u},\hat{v}) \in \hat{E}$ and a substrate link SLink$(u,v) \in E$, $\hat{E}$ and $E$ are the set of all virtual links in the virtual network and the set of all substrate links in the substrate network, respectively, $C_{uv}$ is the cost of allocating unit bandwidth for a VLink in SLink $(u,v)$, $b_{\hat{u}\hat{v}}$ is a bandwidth between the first and second virtual nodes $\hat{u}$ and $\hat{v}$ and $S_{\hat{u}\hat{v}}$ is a spare bandwidth capacity between first and second virtual nodes $\hat{u}$ and $\hat{v}$.

In some embodiments, the method further comprises pre-empting over-commitment of the bandwidth by using a constraint defined by:

$$\forall (u, v) \in E: \sum_{\forall (\hat{u},\hat{v}) \in \hat{E}} x_{uv}^{\hat{u}\hat{v}} \times (b_{\hat{u}\hat{v}} + S_{\hat{u}\hat{v}}) \leq b_{uv}$$

In some embodiments, formulating joint optimization the solution as the Quadratic Integer Program further comprises transforming the Quadratic Integer Program to an Integer Linear Program (ILP).

In some embodiments, transforming the Quadratic Integer Program to the Integer Linear Program comprises formulating the solution to minimize:

$$\sum_{\forall (\hat{u},\hat{v}) \in \hat{E}} \sum_{\forall (u,v) \in E} x_{uv}^{\hat{u}\hat{v}} \times C_{uv} \times b_{\hat{u}\hat{v}} + C_{uv} \times q_{uv}^{\hat{u}\hat{v}}$$

wherein $\hat{u}$ and $\hat{v}$ are first and second virtual nodes in virtual network, u and v are first and second nodes in substrate network, $x_{uv}^{\hat{u}\hat{v}}$ is a mapping between a virtual link VLink$(\hat{u},\hat{v}) \in \hat{E}$ and a substrate link SLink$(u,v) \in E$, $\hat{E}$ and $E$ are the set of all virtual links in the virtual network and the set of all substrate links in the substrate network, respectively, $C_{uv}$ is the cost of allocating unit bandwidth for a VLink for SLink $(u,v)$, $b_{\hat{u}\hat{v}}$ is a bandwidth between the first and second virtual nodes $\hat{u}$ and $\hat{v}$ and $q_{uv}^{\hat{u}\hat{v}}$ is an integer variable related to a spare bandwidth capacity between the first and second virtual nodes $\hat{u}$ and $\hat{v}$.

In some embodiments, the method further comprises pre-empting over-commitment of the bandwidth by using a constraint defined by:

$$\forall (u, v) \in E: \sum_{\forall (\hat{u},\hat{v}) \in \hat{E}} x_{uv}^{\hat{u}\hat{v}} \times b_{\hat{u}\hat{v}} + q_{uv}^{\hat{u}\hat{v}} \leq b_{uv}$$

In some embodiments, jointly optimizing the provisioning of the bandwidth capacity for the virtual network and embedding the virtual network on the substrate network comprises optimizing by obtaining a solution to the joint optimization using a heuristic process.

In some embodiments, jointly optimizing the provisioning of the backup bandwidth capacity for the virtual network and embedding the virtual network on the substrate network comprises:

for each virtual link between a pair of virtual nodes in the virtual network, allocating spare bandwidth capacity along a non-empty virtual path between the pair of nodes, wherein the back up virtual path is disjoint from a primary virtual link between the pair of nodes such that bandwidth is available between the pair of virtual nodes when the primary virtual link is affected by a substrate link failure in the substrate network;

embedding each virtual node to one substrate node in the substrate network, such that multiple virtual nodes from a same virtual network request are not mapped to a same substrate node;

embedding each virtual link onto a non-empty substrate path having sufficient bandwidth to accommodate a virtual link's primary bandwidth demand and backup spare capacity provisioned on the virtual link; and disjointedly embedding the primary virtual link and backup virtual links on the backup virtual path to mitigate an effect of substrate link failure of a single link affecting the primary virtual link and the backup virtual links at a same time.

In some embodiments, jointly optimizing the provisioning of the backup bandwidth capacity for the virtual network and embedding the virtual network on the substrate network comprises:

performing an initial embedding of the virtual network and finding estimated spare backup bandwidth capacity on virtual links in a virtual network for at least one primary virtual link by:

finding a backup virtual path for each primary virtual link incident to a virtual node and estimating spare backup bandwidth capacity on the virtual link belonging to the path;

determining disjointedness requirements based on the estimated spare backup bandwidth capacity;

embedding the virtual node û to a substrate node incurring least cost of embedding for the virtual links incident to to the virtual node;

embedding the virtual links incident to the virtual node on a substrate path having sufficient bandwidth to serve a primary bandwidth demand of the virtual link and estimated spare backup capacity;

identifying paths consisting of the virtual links allocated for backup bandwidth capacity belonging to different shared risk groups;

re-determining the spare backup bandwidth capacity on the virtual links allocated for backup bandwidth capacity to further optimize the allocation of spare backup bandwidth capacity.

According to an aspect of the application there is provided an apparatus comprising a processor and a processor readable storage device. The processor readable storage device has stored thereon, processor executable instructions that when executed by the processor cause the processor to jointly optimize provisioning of backup bandwidth capacity for a virtual network and embedding of the virtual network on a substrate network to reduce consumption of substrate network resources, the backup bandwidth capacity allocated within the virtual network being used upon occurrence of a failure in the substrate network. The processor executable instructions further cause the processor to embed the virtual network and the backup bandwidth capacity within the virtual network.

According to an aspect of the application there is provided a processor readable storage device, having stored thereon, processor executable instructions that when executed by the processor cause the processor to jointly optimize provisioning of the backup bandwidth capacity for a virtual network and embedding of the virtual network on a substrate network to reduce consumption of substrate network resources, the backup bandwidth capacity allocated within the virtual network being used upon occurrence of a failure in the substrate network. The processor executable instructions further cause the processor to embed the virtual network and the backup bandwidth capacity within the virtual network.

Other aspects and features of embodiments of the present disclosure will become apparent to those ordinarily skilled in the art upon review of the following description.

BRIEF DESCRIPTION OF THE DRAWINGS

Examples of embodiments of the disclosure will now be described in greater detail with reference to the accompanying drawings.

FIGS. 4A, 4B and 4C are algorithms according to an aspect of the application.

DETAILED DESCRIPTION

Figure 1:
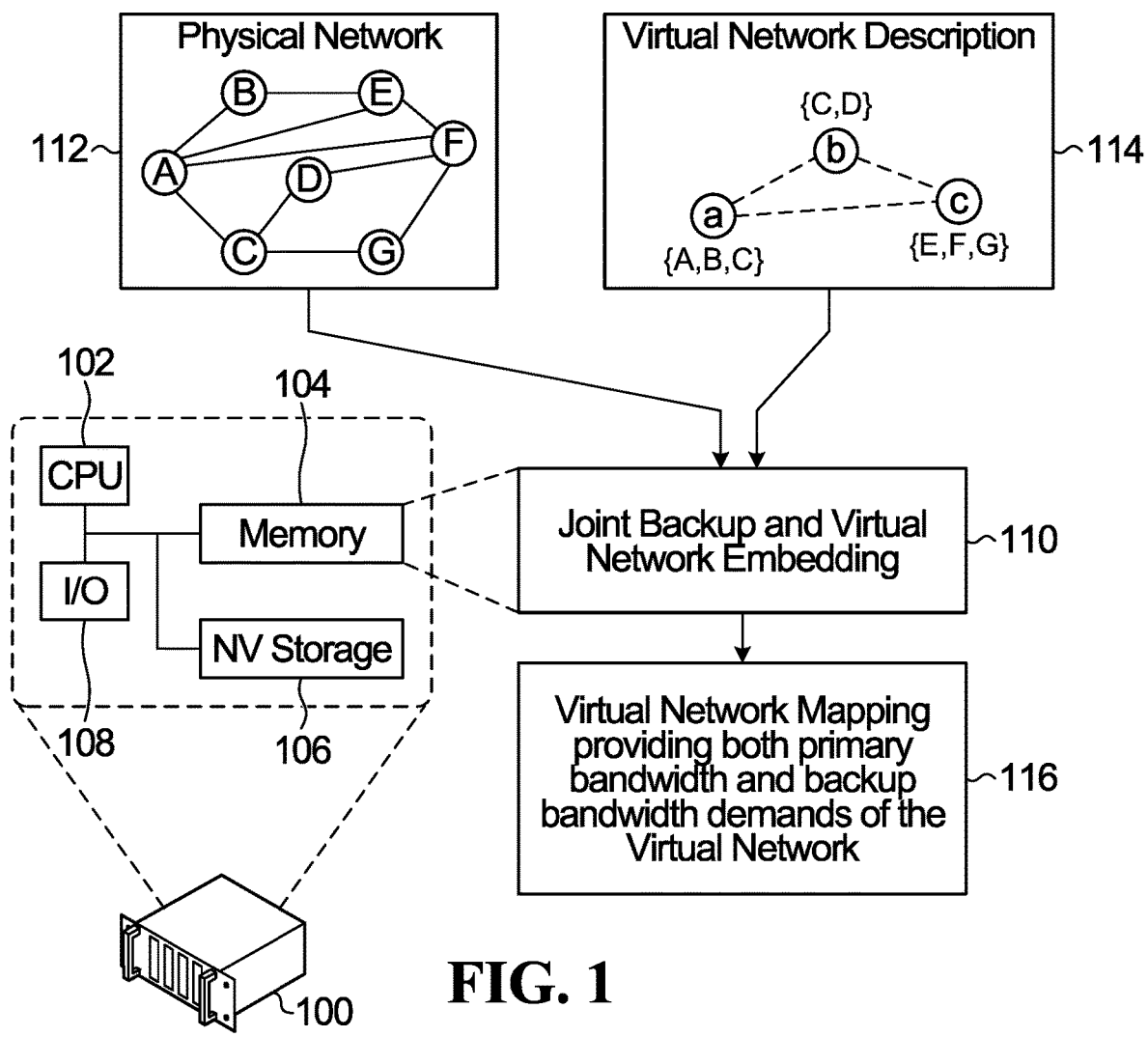
FIG. 1 is a schematic diagram showing an example of a substrate network and a virtual network according to an aspect of the application.

Problems related to mapping the virtual nodes and links of a virtual network request onto substrate nodes and paths, respectively, are known as the Virtual Network Embedding (VNE) problem. If a solution to the VNE problem does not take possible substrate failures into account, then substrate failures can result in degraded Quality of Service (QoS) for the VNs, leading to Service Level Agreement (SLA) violations. A VN embedding that can survive substrate failures is known as a Survivable VNE (SVNE).

Prior work on SVNE has focused primarily on proactively or reactively provisioning backup resources. The following are a few examples of such work.

SVNE with Protection at Substrate Network

Early work in the area by Rahman (M. R. Rahman, I. Aib, and R. Boutaba, "Survivable virtual network embedding," in NETWORKING 2010. Springer, 2010, pp. 40-52) addressed the SVNE problem and formulated the problem as a Mixed Integer Linear Problem. Subsequent research works have addressed different aspects of SVNE such as substrate node (SNode) failure, leverage multi-path embedding, shared backup protection, and dedicated VN topology protection. However, these approaches address problems with the SVNE from an InP's perspective, i.e., the InP provisions backup resources in the SN, disjoint from the primary embedding. Heretofore approaches where the VN can be augmented or equipped with sufficient resources to survive substrate failures have not been explored.

SVNE with Protection at Virtual Network

More recently, an empirical study by Wang et al. (W. Wang et al., "First Demonstration of Virtual Transport Network Services With Multi-layer Protection Schemes over Flexi-grid Optical Networks," IEEE Comm. Letters, vol. 20, no. 2, pp. 260-263, February 2016) compared different protection schemes for network virtualization (NV) in transport software defined networks (T-SDN). The results show that providing protection just at the VN level can increase VN acceptance ratio. Further work studied a weaker version of SVNE with VN level protection. It was proposed to augment the VN to ensure connectivity during multiple substrate link (SLink) failures. However, the result did not guarantee any bandwidth and allows the VNs to operate in a best effort manner.

Internet Protocol Over Wavelength Divisional Multiplexing (IP-Over-WDM) Network Survivability While IP-over-WDM survivable routing has been studied, IP-over-WDM networks assume a fixed placement of IP routers in the network, whereas a VN embedding algorithm needs to determine both virtual node (VNode) and virtual link (VLink) mapping. Therefore, solutions from IP-over-WDM cannot be directly applied to issues being addressed in the present application.

The present application provides methods and apparatus for jointly optimizing spare backup capacity allocation in a virtual network and virtual network embedding. In some embodiments, the methods and apparatus may aid in pre-empting the effects of a single substrate link failure. A single link failure scenario is considered as a most probable occurrence. In some embodiments, the methods and apparatus may aid in minimizing a resource provisioning cost in the substrate network. Spare capacity allocation and virtual network embedding, when performed independently of each other, may lead to solutions that are extremely complex or simply not feasible for implementation.

In some embodiments, an optimal solution is obtained by formulating the joint optimization problem as a Quadratic Integer Program (QIP). In some embodiments, the QIP can be transformed to an Integer Linear Program (ILP). These optimal solution formulations can be computationally complex and thus difficult to implement under real-time constraints. In some embodiments, a heuristic solution is proposed that is computationally simpler than the optimal solution and has nominal degradations in comparison.

Network virtualization has evolved as a key enabling technology for offering the next generation of network services. With increasing deployments of virtualized networks in production networks using commodity hardware, virtual network embedding is expected to handle failures in the underlying substrate network. The virtual network embedding described further herein attempts to provide efficient techniques for protection of multiple virtual networks against a single node or link failure without relying on redundant substrate network resources for each of the individual virtual network elements.

In providing the virtual network embedding, the embedding policy of the virtual nodes must satisfy the location constraints of the virtual nodes. Further, each virtual node is mapped to a single physical node. No physical node is shared between multiple virtual nodes from the same virtual network that has been requested to be embedded on the physical network. Each virtual link should be mapped to a set of physical links that satisfy the virtual link's bandwidth requirement.

FIG. 1 depicts components of a system for virtual network embedding. The system may comprise one or more computing devices, represented as a single server 100. Although depicted as a single server 100, the system may be implemented as one or more real or virtual servers. Regardless of the particular implementation, the server 100 includes a computer processing unit (CPU) 102 for executing instructions and a memory 104 for storing instructions, as well as data. The server 100 may further comprise non-volatile (NV) storage 106 for providing storage of both instructions and data for long periods of time. Further, the server 100 may include one or more input/output (I/O) interfaces or devices 108 that allow the server to interact with users and/or other systems. For example, the I/O interfaces or devices 108 may include keyboards, mice, monitors, network interfaces, etc. The instructions stored in the memory 104 may configure the server 100 to provide a joint backup and virtual network embedding functionality 110. Broadly, the joint backup and virtual network embedding functionality 110 is responsible for jointly optimizing backup bandwidth capacity for a virtual network and embedding the virtual network, including the primary paths and the backup capacity bandwidth paths, on a substrate network, also referred to herein as a physical network 112. The backup bandwidth capacity is allocated within the virtual network.

As depicted, the physical network 112 comprises a plurality of physical nodes A, B, C, D, E, F, G and a number of physical links, depicted as lines, connecting the nodes A, B, C, D, E, F, G. Each of the physical links has an associated bandwidth capacity, which may differ from link to link. In addition to the bandwidth capacity, each link may also have an associated cost for providing a unit of bandwidth.

The virtual network description 114 may describe the topology and constraints of the virtual network to be embedded onto the physical network 112. As depicted, the virtual network description 114 comprises three virtual nodes a, b, c connected by virtual links each having a bandwidth requirement. Additionally, the virtual network description includes location constraints for each of the virtual nodes. As depicted, the location constraint set for virtual node a is {A,B,C}, indicating that virtual node a must be provisioned on one of physical nodes A, B or C. Similarly, the virtual node b must be provisioned on physical node C or D, and virtual node c must be provisioned on physical node E, F or G.

In a particular example, the requested virtual network is embedded such that virtual node a is provisioned on physical node A, virtual node b is provisioned on physical node C, and virtual node c is provisioned on physical node G.

The joint backup and virtual network embedding functionality 110 generates a virtual network mapping 116 providing both primary bandwidth and backup bandwidth demands of the Virtual Network are met.

In the following description, a physical network is represented as an undirected graph G=(V,E) where V and E are the set of physical nodes and links, respectively. Each physical link l(u,v) between two physical nodes u and v has a bandwidth capacity $b_{uv}$ and a cost $C_{uv}$ for allocating unit bandwidth on the physical link when provisioning a virtual link. It is assumed that the SNodes are network nodes with sufficient capacity to switch traffic at peak rate between any pair of ports. Therefore, no node mapping cost or node capacity constraint is considered. The set of neighbors of each physical node is represented by N(u). A virtual network is represented by an undirected graph $\hat{G}=(\hat{V},\hat{E})$, where $\hat{V}$ and $\hat{E}$ are the set of virtual nodes and virtual links respectively. The set of neighbors of each physical node is represented by N($\hat{v}$). Each virtual link l($\hat{u},\hat{v}$) between virtual nodes $\hat{u}$ and $\hat{v}$ has a bandwidth requirement $b_{\hat{u}\hat{v}}$. Each virtual node $\hat{u}$ has a location constraint set L($\hat{u}$) of physical nodes such that a virtual node $\hat{u}$ can only be provisioned on a physical node u belonging to the set L($\hat{u}$). We assume the virtual networks are 2-edge connected, i.e., at least two disjoint paths exist between any two virtual nodes.

Given a substrate network G=(V,E), a virtual network VN $\hat{G}=(\hat{V},\hat{E})$, and a set of location constraints L, it is possible to jointly optimize backup bandwidth capacity for a virtual network and embed the virtual network on a substrate network. Steps involved in the optimizing and embedding process may include, but are not limited to:

for each VLink $(\hat{u},\hat{v})\in\hat{E}$, optimally allocate spare bandwidth along a non-empty path $P_{\hat{u},\hat{v}}$ in the virtual network (VPath), disjoint from $(\hat{u},\hat{v})$ such that $b_{\hat{u},\hat{v}}$ bandwidth is available between VNodes $\hat{u}$ and $\hat{v}$ even after $(\hat{u},\hat{v})$ is affected by a substrate link failure;

embed each VNode $\hat{u}\in\hat{V}$ to exactly one SNode, u∈V, multiple VNodes from the same VN request should not be mapped to the same SNode;

embed each VLink $(\hat{u},\hat{v})\in\hat{E}$ onto a non-empty substrate path (SPath) $P_{\hat{u},\hat{v}}$ having sufficient bandwidth to accommodate the primary demand and backup spare capacity provisioned on $(\hat{u},\hat{v})$; and disjointly embed a VLink $(\hat{u},\hat{v})\in\hat{E}$ and the VLinks on its backup VPath $\hat{P}_{\hat{u},\hat{v}}$ to mitigate the effect of a single SLink failure.

It is desired that the total cost of allocating bandwidth on the SN to embed the VN along with the spare capacity is minimized.

VLinks that share at least one SLink on their embedding share the risk of failure since all of the VLinks can fail if the shared SLink fails. A set of VLinks belong to the same Shared Risk Group (SRG) if and only if they share at least one SLink on their embedding. On the other hand, VLinks that do not share any SLink on their embedding belong to different SRGs. To represent SRG memberships, the VLinks are partitioned into a number of SRGs represented by the set D=$\{d_1, d_2, d_3, \ldots, d_{|D|}\}$, where $|D|\leq|\hat{E}|$. A VLink belongs to exactly one SRG $d_i\in D$ and shares at least one SLink on the VLink's embedding with other VLinks in $d_i$. The following decision variable can be used to decide on a VLink's membership to an SRG:

$$d_i^{\hat{u}\hat{v}} = \begin{cases} 1 & \text{if } f(\hat{u},\hat{v}) \in \hat{E} \text{ belongs to } SRG\ d_i \in D, \\ 0 & \text{otherwise} \end{cases}$$

Figure 2:
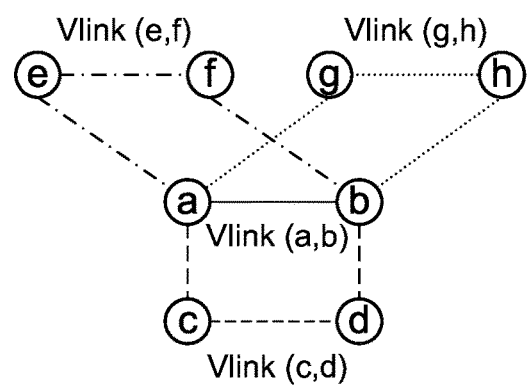
FIG. 2 is a diagram showing an example of a virtual link being used for backup capacity of other links according to an aspect of the application.

Based on how the VLinks form different SRGs after embedding, the requirement for spare backup capacity on the VLinks can be different. This can be explained with a simple example. In FIG. 2, there are eight virtual nodes a, b, c, d, e, f, g and h. A link between virtual nodes a and b defined as VLink (a,b) is on the backup path of three other links, VLink(c,d), VLink(e,f) and VLink(g,h). Different spare capacity can be assigned on VLink(a,b) to protect VLink(c,d), VLink(e,f), and VLink(g,h), based on how these three VLinks are embedded. Consider the following scenarios regarding their embedding:

All Three Belong to the Same SRG

Figure 3A:
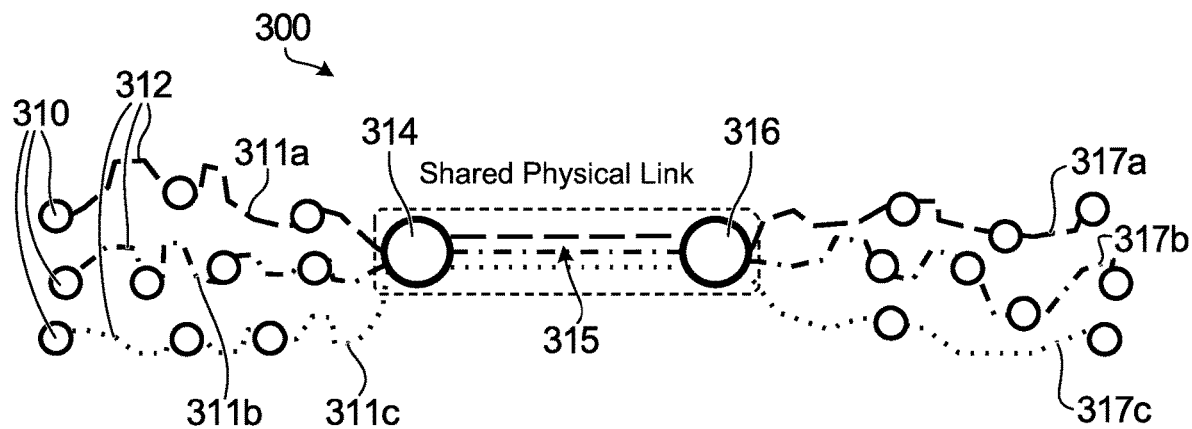
FIGS. 3A, 3B and 3C are diagrams showing examples of different physical embedding of the virtual links of FIG. 2.

If all three VLinks are in the same SRG, then the three VLinks share at least one physical link between their substrate embedding path. This is shown in FIG. 3A. FIG. 3A illustrates a communication network 300 having multiple substrate nodes, some nodes identified as nodes 310, that are connected by substrate links, for example links 312. Starting from left to right in FIG. 3A there are three separate paths 311a, 311b, 311c of substrate links and substrate nodes that eventually meet at node 314. The three paths 311a, 311b, 311c share a physical link 315 to connect to node 316. To the right of node 316, three separate paths 317a, 317b, 317c are again formed with respective nodes and links. A single substrate failure, for example in nodes 314 or 316 or in link 315, can affect all three VLinks. Therefore, spare backup capacity allocated on virtual link (a, b) should be sufficient to support the bandwidth requirement of all three VLinks, i.e., $b_{cd}+b_{ef}+b_{gh}$.

All Three Belong to Different SRG

Figure 3B:
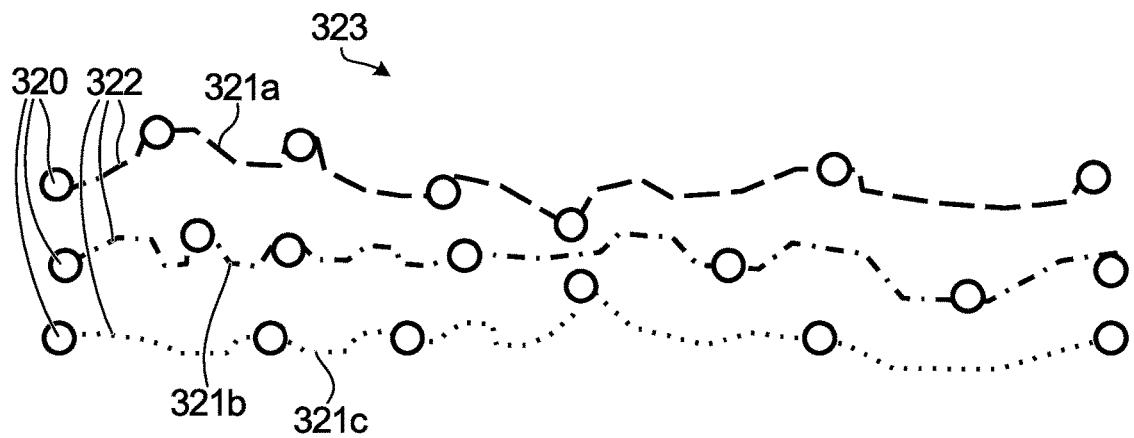

If all three VLinks belong to different SRGs, then they do not share any SLink between their substrate embedding paths. This is shown in FIG. 3B. FIG. 3B illustrates a communication network 323 having multiple substrate nodes, some nodes identified as nodes 320, that are connected by substrate links, for example links 322. Starting from left to right in FIG. 3A there are three separate paths 321a, 321b, 321c of substrate links and substrate nodes. There are no shared paths in FIG. 3B. At most one of the three VLinks will be affected by a single SLink failure. Therefore, the spare backup capacity allocated on (a,b) should be sufficient to support the maximum bandwidth requirement of these three VLinks, i.e., max($b_{cd}$; $b_{ef}$; $b_{gh}$).

Two Belong to the Same SRG, the Third in a Different SRG

Figure 3C:
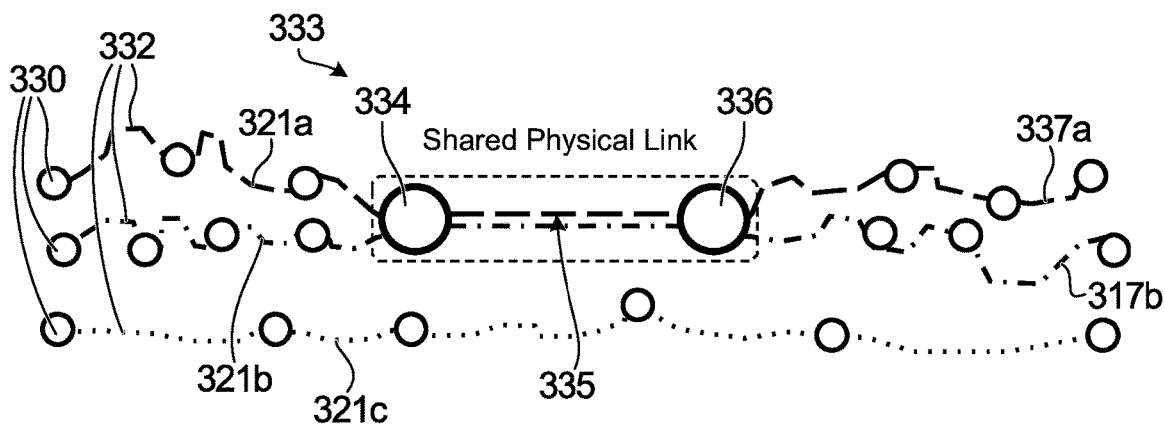

The substrate embedding can create multiple SRGs out of these three VLinks. An example of this is shown in FIG. 3C. FIG. 3C illustrates a communication network 333 having multiple substrate nodes, some nodes identified as nodes 330, that are connected by substrate links, for example links 332. Starting from left to right in FIG. 3C there are three separate paths 331a, 331b, 331c of substrate links and substrate nodes. Two of the paths 331a and 331b eventually meet at node 334. The two paths 331a, 331b share a physical link 335 to connect to node 336. To the right of node 336, two separate paths 337a and 337b are again formed with respective nodes and links. The third path 331c remains separate from the other two paths 331a and 331b. In FIG. 3C, VLinks (c,d) and (e,f) belong to the same SRG, whereas VLink (g,h) belongs to a different SRG. A single substrate failure will then affect only one group. Therefore, spare capacity allocated on (a,b) should be sufficient to support the group with the maximum requirement. For the group with (c,d) and (e,f), the bandwidth requirement is $b_{cd}+b_{ef}$. For the other group, the requirement is $b_{gh}$. Therefore, spare backup capacity on (a,b) should be max($b_{cd}+b_{ef}$; $b_{gh}$).

More formally, if a VLink $(\hat{u},\hat{v})\in\hat{E}$, is present on the backup VPath for a set of VLinks $\hat{\mathcal{H}}_{\hat{u},\hat{v}}\subseteq\hat{E}$, and VLinks in $\hat{E}$ form a set of D=$\{d_1, d_2, d_3, \ldots d_{|D|}\}$ SRGs, the spare bandwidth allocation on $(\hat{u},\hat{v})$ can be generalized as:

$$\max_{\forall d_i \in D} \left( \sum_{\forall (\hat{x},\hat{y}) \in \hat{\mathcal{H}}_{\hat{u}\hat{v}}} d_i^{\hat{x}\hat{y}} b_{\hat{x}\hat{y}} \right) \quad (1)$$

Decision Variables

For each virtual link VLink $(\hat{u},\hat{v})\in\hat{E}$, there is a VPath $P_{\hat{u},\hat{v}}$ that provides protection to that VLink from single SLink failure. When any SLink on the VLink's embedding fails, the protection path provides the same bandwidth $b_{\hat{u},\hat{v}}$ between the VNodes $\hat{u}$ and $\hat{v}$. The following decision variable defines whether a VLink $(\hat{u},\hat{v})\in\hat{E}$ belongs to the VPath protecting a VLink $(\hat{x},\hat{y})\in\hat{E}$:

$$z_{\hat{x}\hat{y}}^{\hat{u}\hat{v}} = \begin{cases} 1 & \text{if } (\hat{u},\hat{v})\in E \text{ is in the backup path of } (\hat{x},\hat{y})\in\hat{E}, \\ 0 & \text{otherwise} \end{cases}$$

Note that, $x_{\hat{u}\hat{v}}^{\hat{u}\hat{v}}=0$, since a VLink's backup VPath has to be edge disjoint from itself.

The following decision variable indicates the mapping between a VLink $(\hat{u},\hat{v})\in\hat{E}$ and an SLink $(u,v)\in E$:

$$x_{uv}^{\hat{u}\hat{v}} = \begin{cases} 1 & \text{if } (\hat{u},\hat{v})\in\hat{E} \text{ is mapped to } (u,v)\in E, \\ 0 & \text{otherwise} \end{cases}$$

The following decision variable represents the virtual node mapping:

$$y_{\hat{u}u} = \begin{cases} 1 & \text{if } \hat{u}\in\hat{V} \text{ is mapped to } u\in V, \\ 0 & \text{otherwise} \end{cases}$$

VLinks that share at least one SLink in their embedding belong to the same SRG. SRG membership is defined using the decision variable $d_i^{\hat{u}\hat{v}}$ as defined above.

Constraints

Types of constraints involved in the optimization include virtual node mapping constraints, backup virtual path continuity constraints, virtual link mapping constraints and disjointedness constraints, each of which will be discussed in further detail below.

Virtual Node Mapping Constraints

Expressions (2) and (3) below ensure that VNodes from a single VN are provisioned on single SNodes satisfying provided location constraints. Moreover, expression (4) ensures that an SNode does not host more than one VNode from the same VN.

$$\forall \hat{u}\in\hat{V}, \forall u\in V: y_{\hat{u}u} \leq l_{\hat{u}u} \quad (2)$$

$$\forall \hat{u}\in\hat{V}: \sum_{u\in V} y_{\hat{u}u} = 1 \quad (3)$$

$$\forall u\in V: \sum_{\hat{u}\in\hat{V}} y_{\hat{u}u} \leq 1 \quad (4)$$

VNode embedding follows from the VLink embedding, since there is no cost associated with VNode embedding.

Backup VPath Continuity Constraints

A VLink in a VN is protected by a VPath in the VN to survive single SLink failure. The following constraint (expression (5)) ensures continuity of a backup VPath protecting a VLink $(\hat{x},\hat{y})\in\hat{E}$:

$$\forall (\hat{x},\hat{y})\in\hat{E}: \sum_{\forall \hat{v}\in N(\hat{u})\setminus\{\hat{y}\}} (z_{\hat{x}\hat{y}}^{\hat{u}\hat{v}} - z_{\hat{x}\hat{y}}^{\hat{v}\hat{u}}) = \begin{cases} 1 & \text{if } \hat{u}=\hat{x} \\ -1 & \text{if } \hat{u}=\hat{y} \\ 0 & \text{otherwise} \end{cases} \quad (5)$$

VLink Mapping Constraints

First, every VLink is mapped to a non-empty set of SLinks using expression (6). Then, the in-flow and out-flow of each SNode is set to be equal, except for the nodes where the endpoints of a VLink are mapped using expression (7). Expression (7) ensures that a non-empty set of SLinks corresponding to a VLink's mapping forms a single continuous SPath.

$$\forall (\hat{u},\hat{v})\in\hat{E}: \sum_{\forall (u,v)\in E} x_{uv}^{\hat{u}\hat{v}} \geq 1 \quad (6)$$

$$\forall \hat{u},\hat{v}\in\hat{V}, \forall u\in\hat{V}: \sum_{\forall v\in N(u)} (x_{uv}^{\hat{u}\hat{v}} - x_{vu}^{\hat{u}\hat{v}}) = y_{\hat{u}u} - y_{\hat{v}u} \quad (7)$$

The binary nature of the VLink mapping decision variable and the flow constraint prevents any VLink from being mapped onto more than one SPaths, thus, restricting the VLink mapping to a Multi-commodity Unsplittable Flow Problem. To be able to provide adequate backup capacity the resources on the SLinks should not be over-committed. Therefore, the spare bandwidth allocated to a VLink $(\hat{u},\hat{v})\in\hat{E}$ that serves as a backup for other VLinks is computed. The spare bandwidth allocated to a VLink $(\hat{u},\hat{v})\in\hat{E}$ is represented by $S_{\hat{u}\hat{v}}$ and expression (1) is used to define $S_{\hat{u}\hat{v}}$ as follows in expression (8):

$$S_{uv} = \max_{\forall d_i} \sum_{\forall (\hat{x},\hat{y})\in\hat{E}\setminus\{(\hat{u},\hat{v})\}} z_{\hat{x}\hat{y}}^{\hat{u}\hat{v}} \times d_i^{\hat{x}\hat{y}} \times b_{\hat{x}\hat{y}} \quad (8)$$

Then, the following constraint (expression (9)) prevents any over-commit of the bandwidth resource in the SLinks:

$$\forall (u,v)\in E: \sum_{\forall (\hat{u},\hat{v})\in\hat{E}} x_{uv}^{\hat{u},\hat{v}} \times (b_{\hat{u}\hat{v}} + s_{\hat{u}\hat{v}}) \leq b_{uv} \quad (9)$$

Expression (9) is a cubic constraint, since $S_{\hat{u}\hat{v}}$ is quadratic according to expression (8). The following steps are taken to linearize the definition of $S_{\hat{u}\hat{v}}$ to ensure that the constraint expression (9) remains quadratic. First, a new variable $g_{\hat{x}\hat{y}}^{\hat{u}\hat{v}}(i)$ is defined as follows:

$$g_{\hat{x}\hat{y}}^{\hat{u}\hat{v}}(i) = \begin{cases} 0 & \text{if } z_{\hat{x}\hat{y}}^{\hat{u}\hat{v}}=1 \text{ and } d_i^{\hat{x}\hat{y}}=1, \\ 1 & \text{otherwise} \end{cases}$$

Essentially, for a given VLink $(\hat{u},\hat{v})\in\hat{E}$, the zero values of $g_{\hat{x}\hat{y}}^{\hat{u}\hat{v}}(i)$ induces a set of VLinks such that the VLinks belong to the same SRG and have virtual nodes $(\hat{u},\hat{v})$ on their backup virtual path. The value of $g_{\hat{x}\hat{y}}^{\hat{u}\hat{v}}(i)$ is set using the following constraint as shown expression (10):

$$\forall(\hat{u},\hat{v})\in\hat{E}, \forall(\hat{x},\hat{y})\in\hat{E}, \forall d_i\in D: z_{\hat{x}\hat{y}}^{\hat{u}\hat{v}} + d_i^{\hat{x}\hat{y}} + g_{\hat{x}\hat{y}}^{\hat{u}\hat{v}} \leq 2 \quad (10)$$

Now expression (8) can be rewritten in a linear form using the variable $g_{\hat{x}\hat{y}}^{\hat{u}\hat{v}}(i)$ as follows in expression (11):

$$S_{\hat{u}\hat{v}} = \max_{\forall d_i} \sum_{\forall (\hat{x},\hat{y}) \in \hat{E} \setminus \{(\hat{u},\hat{v})\}} \left(1 - g_{\hat{x}\hat{y}}^{\hat{u}\hat{v}}(i)\right) \times b_{\hat{x}\hat{y}} \quad (11)$$

Since a resulting objective function is a minimization function, $g_{\hat{x}\hat{y}}^{\hat{u}\hat{v}}(i)$ is defined so that setting $g_{\hat{x}\hat{y}}^{\hat{u}\hat{v}}(i)$ to 1 minimizes the value of $S_{\hat{u}\hat{v}}$, unless it is constrained to be 0 according to expression (10). This constrained case will only occur when both $z_{\hat{x}\hat{y}}^{\hat{u}\hat{v}}$ and $d_i^{\hat{x}\hat{y}}$ are 1, as defined by expression (10).

Disjointedness Constraints

The mappings of the VLinks from an SRG $d_i$ are disjoint from the mappings of the VLinks from a different SRG $d_j (\forall_j \neq i)$. This is ensured by expression (12) below. Expression (13) ensures that two VLinks from the same SRG share at least one SLink in their mappings. Note that a VLink $(\hat{u},\hat{v}) \in \hat{E}$ cannot be present in more than one SRG, which is ensured by expression (14).

$$\forall (\hat{u},\hat{v}) \in E, \forall (\hat{u},\hat{v}) \in d_i, \forall (\hat{x},\hat{y}) \in d_j \text{ s.t.} \quad (12)$$
$$i \neq j: d_i^{\hat{u}\hat{v}} + d_j^{\hat{x}\hat{y}} + x_{uv}^{\hat{u}\hat{v}} + x_{vu}^{\hat{u}\hat{v}} + x_{uv}^{\hat{x}\hat{y}} + x_{vu}^{\hat{x}\hat{y}} \leq 3$$

$$\forall d_i \in D, \forall ((\hat{u},\hat{v}),(\hat{x},\hat{y})) \in d_i \times d_i \text{ s.t. } (\hat{u},\hat{v}) \neq (\hat{x},\hat{y}), \quad (13)$$
$$\exists (u,v) \in E: d_i^{\hat{u}\hat{v}} + d_i^{\hat{x}\hat{y}} + x_{uv}^{\hat{u}\hat{v}} + x_{uv}^{\hat{x}\hat{y}} + x_{vu}^{\hat{x}\hat{y}} = 4$$

$$\forall (\hat{x},\hat{y}) \in \hat{E}: \sum_{\forall d_i \in D} d_i^{\hat{x}\hat{y}} = 1 \quad (14)$$

To ensure survivability of the VN under single SLink failure, the mapping of a VLink cannot share any SLink with the mappings of the VLinks present on its backup VPath. The following constraint (expression (15)) ensures this disjointedness:

$$\forall (u,v) \in E, \forall ((\hat{u},\hat{v}),(\hat{x},\hat{y})) \in \hat{E} \times \hat{E} s.t.(\hat{u},\hat{v}) \neq (\hat{x},\hat{y}): z_{\hat{u}\hat{v}}^{\hat{x}\hat{y}} + x_{uv}^{\hat{u}\hat{v}} + x_{vu}^{\hat{u}\hat{v}} + x_{uv}^{\hat{x}\hat{y}} + x_{vu}^{\hat{x}\hat{y}} \leq 2 \quad (15)$$

It is desired to minimize the cost of provisioning bandwidth on the physical links. Accordingly, the objective function of expression (15) will provide a solution for the embedding in the form of expression (16).

$$\text{minimize}\left(\sum_{\forall(\hat{u},\hat{v})\in\hat{E}} \sum_{\forall(u,v)\in E} x_{uv}^{\hat{u}\hat{v}} \times C_{uv} \times (b_{\hat{u}\hat{v}} + S_{\hat{u}\hat{v}})\right) \quad (16)$$

The formulation for the joint optimization problem has a quadratic constraint as shown in expression (9) and a quadratic objective function as shown in expression (16). Presented below is a manner of linearizing the QIP by transforming the QIP into an Integer Linear Program (ILP).

For the purpose of linearization, a bound is placed on the spare bandwidth of a VLink $(\hat{u},\hat{v}) \in \hat{E}$ i.e., $S_{\hat{u}\hat{v}}: 0 \leq S_{\hat{u}\hat{v}} \leq \lambda$ where $\lambda$ is a very large integer. A new integer variable $q_{uv}^{\hat{u}\hat{v}}$, is introduced that is defined in terms of $x_{uv}^{\hat{u}\hat{v}}$ as follows:

$$q_{uv}^{\hat{u}\hat{v}} = \begin{cases} S_{\hat{u}\hat{v}} & \text{if } x_{xy}^{\hat{u}\hat{v}} = 1, \\ 0 & \text{if } x_{xy}^{\hat{u}\hat{v}} = 0. \end{cases}$$

The following constraints (expressions (17) and (18)) enforce the relationship between $q_{uv}^{\hat{u}\hat{v}}$ and $x_{uv}^{\hat{u}\hat{v}}$:

$$\forall (u,v) \in E, \forall (\hat{u},\hat{v}) \in \hat{E}: q_{uv}^{\hat{u}\hat{v}} \geq 0 \quad (17)$$

$$\forall (u,v) \in E, \forall (\hat{u},\hat{v}) \in \hat{E}: S_{\hat{u}\hat{v}} - \lambda \times (1 - x_{uv}^{\hat{u}\hat{v}}) \leq q_{uv}^{\hat{u}\hat{v}} \quad (18)$$

To elaborate, when $x_{uv}^{\hat{u}\hat{v}}=0$, constraint expressions (17) and (18) become $q_{uv}^{\hat{u}\hat{v}} \geq 0$ and $S_{\hat{u}\hat{v}} - \lambda \leq q_{uv}^{\hat{u}\hat{v}}$, respectively. Since $\lambda$ is a very large number by definition, the constraints finally reduce to $q_{uv}^{\hat{u}\hat{v}} \geq 0$. On the other hand, when $x_{uv}^{\hat{u}\hat{v}}=1$, constraint expressions (17) and (18) become $q_{uv}^{\hat{u}\hat{v}} \geq 0$ and $S_{\hat{u}\hat{v}} \leq q_{uv}^{\hat{u}\hat{v}}$, respectively. In this later case, constraint expression (18), i.e., $S_{\hat{u}\hat{v}} \leq q_{uv}^{\hat{u}\hat{v}}$ dominates. Finally, $q_{uv}^{\hat{u}\hat{v}}$ is included in the minimization objective function and the smallest possible value of $q_{uv}^{\hat{u}\hat{v}}$ will be used to minimize the value of the objective function yielding $q_{uv}^{\hat{u}\hat{v}}=S_{\hat{u}\hat{v}}$. The capacity constraint expression (9) can be re-written in the form of expression (19) as a linear constraint using $q_{uv}^{\hat{u}\hat{v}}$.

$$\forall (u,v) \in E: \sum_{\forall (\hat{u},\hat{v}) \in \hat{E}} x_{uv}^{\hat{u}\hat{v}} \times b_{\hat{u}\hat{v}} + q_{uv}^{\hat{u}\hat{v}} \leq b_{uv} \quad (19)$$

Similarly, the quadratic objective function can be written in a linearized form as expression (20):

$$\text{minimize}\left(\sum_{\forall(\hat{u},\hat{v})\in\hat{E}}\sum_{\forall(u,v)\in E} x_{uv}^{\hat{u}\hat{v}} \times C_{uv} \times b_{\hat{u}\hat{v}} + C_{uv} \times q_{uv}^{\hat{u}\hat{v}}\right). \quad (20)$$

There are several challenges in implementing a heuristic for the joint optimization of spare backup capacity allocation and embedding problem. Several non-limiting examples of such problems include selection of backup VPath, VNode embedding and disjoint SPath computation.

A first challenge in implementing the heuristic is the selection of a backup VPath from an exponential number of VPaths.

A further challenge comes from VNode embedding. The order of VNode embedding and the embedding itself have a profound impact on subsequent VLink embedding. Care must be taken while choosing an SNode for a VNode to avoid incurring a high cost embedding. Although no cost is being considered for VNode embedding, the VNode embedding directly influences the possible SPaths that can be chosen for the incident VLinks on the VNode, which subsequently impacts the cost of a solution. This makes the VNode embedding a combinatorial optimization problem. In some embodiments, the VNodes are embedded from the most constrained to the least constrained, to minimize chances of embedding failure at a later stage due to resource exhaustion. The constraint of a VNode may be measured by its nodal degree i.e., $|N(\hat{u})|$.

VLink embedding in an unsplittable SPath without the disjointedness constraints is at least as hard as solving a NP-Hard Multi-commodity Unsplittable Flow Problem. In some embodiments, the disjoint SPaths are iteratively computed using a modified version of Dijkstra's shortest path algorithm.

FIGS. 4A, 4B and 4C are example of a heuristic algorithm and functions that can be called by the algorithm that are presented as pseudocode. The heuristic algorithm of FIG. 4A solves the joint optimization problem in two steps: (i) the algorithm estimates the spare backup capacity on the VLinks, determines the disjointedness requirements based on this estimation, and performs an initial VN Embedding, (ii) then, the algorithm identifies cycles consisting of VLinks belonging to different SRGs and recomputes the backups to use the cycle to re-optimize backup capacity allocation. Upon success, the heuristic algorithm of FIG. 4A returns variables nmap, emap, backup, and S representing the VNode mapping, VLink mapping, backup VPaths, and spare backup capacities, respectively.

Initially, the estimated spare bandwidth of each VLink, $S_{\hat{u}\hat{v}}^{est}$ is initialized to 0 and all of the VLinks are set to a single SRG $d_1$. Then the VNodes are embedded from the most constrained to the least constrained ones, i.e., in decreasing order of the VNodes' degrees. For a VNode û, the algorithm of FIG. 4A finds estimated backup VPaths for each VLink incident to û by iteratively invoking a GetBackup function shown in FIG. 4B. The algorithm of FIG. 4B invokes a Constrained Weighted Shortest Path (CWSP) procedure to compute a VPath with at least $b_{\hat{u}\hat{v}}$ bandwidth between û and $\hat{v}$ in the VN Ĝ, according to a provided weight function. The algorithm of FIG. 4B first computes the weight function $Weight^{est}$ for all the VLinks and invokes CWSP to obtain the backup VPath between û and $\hat{v}$. The algorithm of FIG. 4B assigns lower weights to VLinks with already assigned backups to enhance the sharing of spare bandwidth by more VPaths (Line 3 of the algorithm of FIG. 4B). The weight function also takes the embedding cost of an already mapped VLink $(\hat{x},\hat{y})$ into account and assigns $(\hat{x},\hat{y})$ a weight proportional to embedding cost $\Lambda_{\hat{x}\hat{y}}$. In line 4 of the algorithm of FIG. 4B, a special case occurs when a VLink $(\hat{x},\hat{y})$ is not yet embedded. For this case, $\Lambda_{\hat{x}\hat{y}}$ is set to use the average SPath length (σ) as an indicator of future cost. Finally, an infinite weight is set to the VLinks without adequate residual capacity to exclude them from the search space (Line 6 of the algorithm of FIG. 4B).

After computing the estimated backup VPath $backup_{\hat{u}\hat{v}}^{est}$, the algorithm of FIG. 4A updates $S_{\hat{x}\hat{y}}^{est}$ for all $(\hat{x},\hat{y}) \in backup_{\hat{u}\hat{v}}^{est}$ with the maximum value of $b_{\hat{u}\hat{v}}$ (Line 10 of the algorithm of FIG. 4A). The algorithm then places $(\hat{u},\hat{v})$ and $(\hat{x},\hat{y})$ in different SRGs (Line 13 of the algorithm of FIG. 4A). Finally, the algorithm places $(\hat{u},\hat{v})$ and all other VLinks that use $(\hat{x},\hat{y})$ in the VLinks backup VPaths to different SRGs (Line 17 of the algorithm of FIG. 4A). Then, for all the incident VLinks of a VNode û, the algorithm of FIG. 4A finds the mapping of û and VLinks incident to û. The algorithm of FIG. 4A iterates over all candidate SNodes l∈L(û) and selects the one that results in the lowest cost mappings of all VLinks incident to û (Lines 20-29 of the algorithm of FIG. 4A). For a specific l∈L(û) and $\hat{v}$∈N(û), if $\hat{v}$ is already mapped to $nmap_{\hat{v}}$ the algorithm of FIG. 4A computes CWSP from l to $nmap_{\hat{v}}$ (Line 24 of the algorithm of FIG. 4A), while satisfying capacity constraints and SRG constraints in the SN (using the weights in W). To do so, the algorithm of FIG. 4A identifies the set of SLinks that the mapping of $(\hat{u},\hat{v})$ should be disjoint from and sets ∞ as the weights of the SLinks (Line 22 of the algorithm of FIG. 4A). On the other hand, if $\hat{v}$ is not mapped yet, it computes CWSPs from l to the SNodes y∈L($\hat{v}$) and selects the CWSP with the minimum cost (Line 25 of the algorithm of FIG. 4A). After mapping a VNode û, the algorithm of FIG. 4A maps the VLinks whose both endpoints have been already mapped and updates Λ (Line 33 of the algorithm of FIG. 4A).

The last phase of the heuristic solution includes the use of a further algorithm shown in FIG. 4C, which leverages the concept of p-cycle based protection to optimize the spare backup capacity $S_{\hat{u}\hat{v}}$ for each mapped VLink $(\hat{u},\hat{v})\in\hat{E}$. P-cycle based protection is one of the most efficient shared backup path protection schemes for single layer protection. A p-cycle is formed by connecting the spare capacity in a network in a ring like structure. A p-cycle is formed by connecting the spare capacity in a network in a ring like structure. For instance, is was found by Grover et al. (W. D. Grover and D. Stamatelakis, "Cycle-oriented distributed pre-configuration: ring-like speed with mesh-like capacity for self-planning network restoration," in IEEE ICC, 1998, pp. 537-543) that a Hamiltonian p-cycle that passes through all the nodes in a network once, can provide recovery paths for either an on-cycle VLink failure or a straddling VLink failure. The algorithm in FIG. 4C first finds the longest cycle R̂ in Ĝ such that any pair of VLinks in R̂ do not share any SLink in the VLink's mappings (Line 3 of the algorithm of FIG. 4C). As was indicated above, each $(\hat{x},\hat{y})\in\hat{R}$ belongs to distinct SRGs for single link failure. Therefore, the algorithm of FIG. 4C allocates the maximum of the demands of all the VLinks in R̂ to each $S_{\hat{x}\hat{y}}\in R$ (Line 4 of the algorithm of FIG. 4C). The algorithm then recomputes backup VPath $backup_{\hat{u}\hat{v}}$ for each $(\hat{u},\hat{v})\in\hat{E}$ using a process similar to the algorithm of FIG. 4B. However, the algorithm of FIG. 4C utilizes the mapping information to better compute the backup VPaths. It does so by setting ∞ as the weight of the VLink $(\hat{x},\hat{y})$ if $(\hat{u},\hat{v})$ and $(\hat{x},\hat{y})$ are in the same SRG (Line 7 of the algorithm of FIG. 4C). It also enhances the spare capacity sharing by setting unit weights to the VLinks having already assigned spare capacities (Line 8 of the algorithm of FIG. 4C). The algorithm of FIG. 4C then invokes the CWSP procedure with the weight function to compute $backup_{\hat{u}\hat{v}}$. Finally, $S_{\hat{x}\hat{y}}$ for each $(\hat{x},\hat{y})\in backup_{\hat{u}\hat{v}}$ is updated accordingly (Line 12 of the algorithm of FIG. 4C).

Figure 5A:
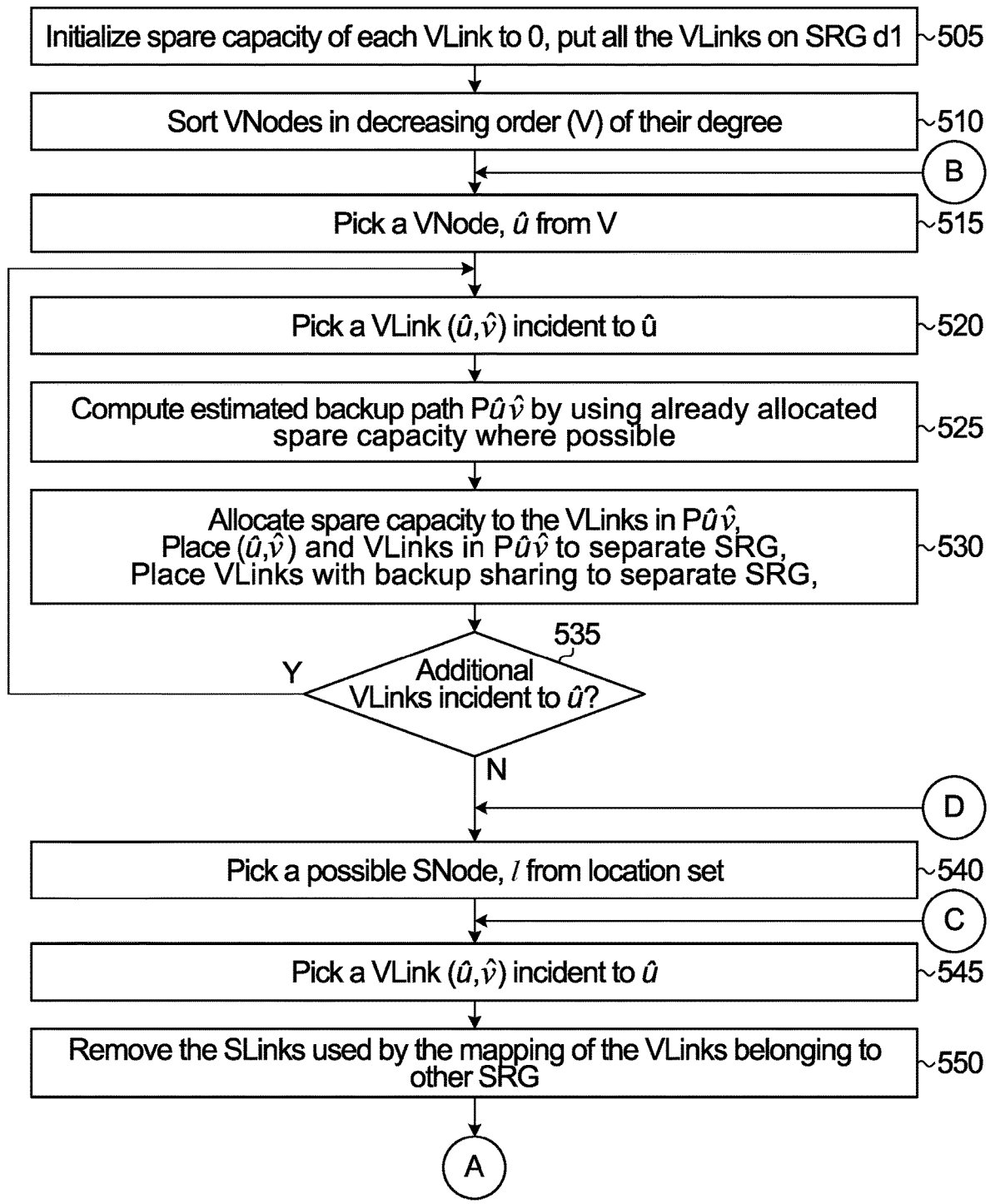
FIGS. 5A and 5B are a flow diagram of an example method according to an embodiment.
Figure 5B:
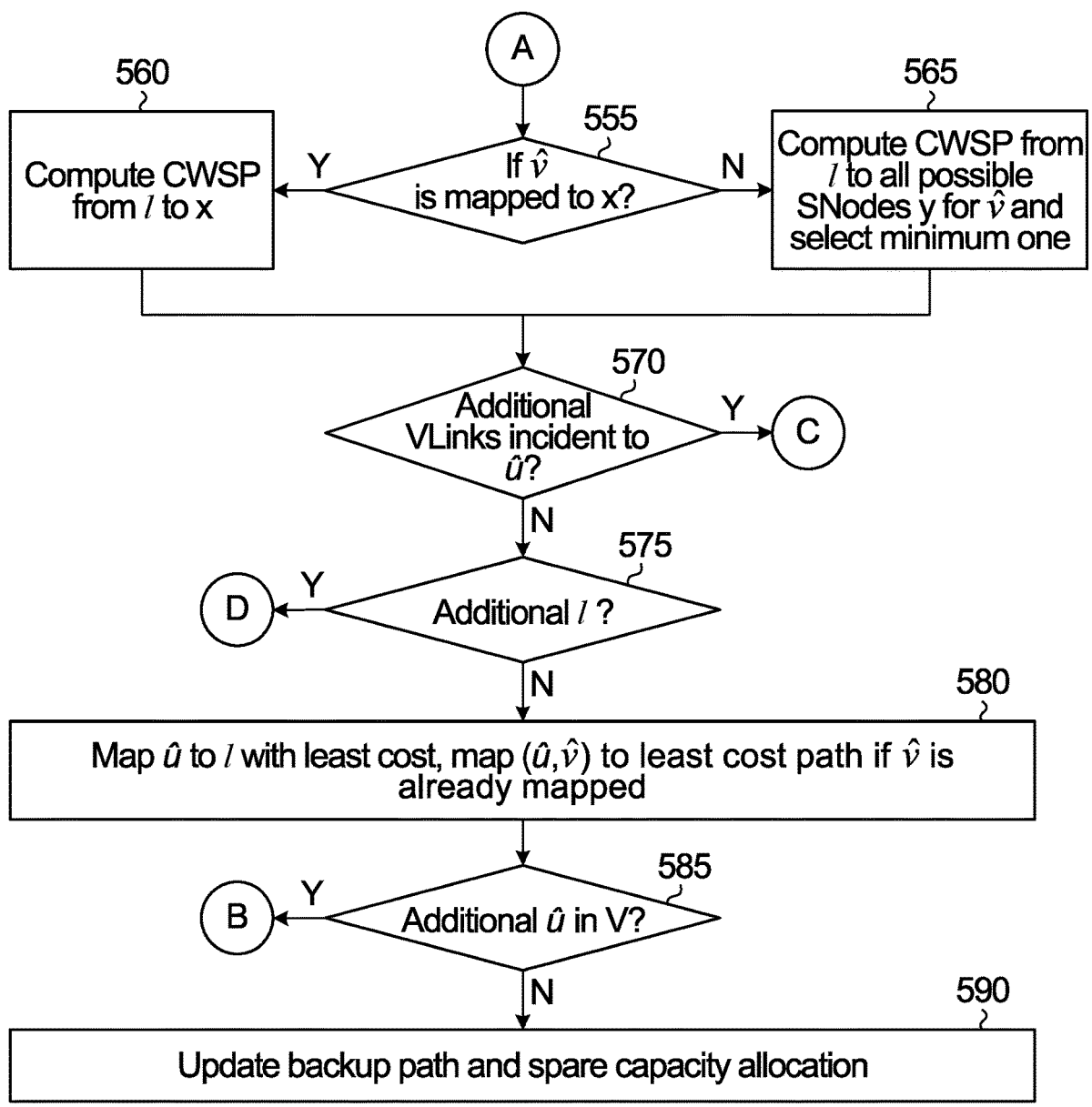

FIGS. 5A and 5B is a flow diagram of an example method 500 that generally corresponds to the pseudocode in the algorithms of FIGS. 4A, 4B, 4C. In step 505, spare capacity of each VLink is initialized to 0 and all of the VLinks are included in a SRG $d_1$. In step 510, the VNodes are sorted in a set (V) according to a decreasing order of the VNode degree so that the VNodes are arranged from most constrained to least constrained. If two or more VNodes have equal degrees then they can be arbitrarily ordered. In step 515, a VNode û is selected from the set V. In step 520, a VLink $(\hat{u},\hat{v})$ is selected that is incident to VNode û. In step 525, an estimated backup path $P_{(\hat{u},\hat{v})}$ is computed using previously allocated spare capacity. Step 525 substantially corresponds to the function in the pseudocode of FIG. 4B. In step 530, spare capacity is allocated to the VLinks in backup path $P_{(\hat{u},\hat{v})}$. In addition in step 530, VLink $(\hat{u},\hat{v})$ and other links in backup path $P_{(\hat{u},\hat{v})}$ are included in a separate SRG and the VLinks with backup sharing are included in yet another separate SRG. Step 535 is a decision step. It is determined in step 535 if there are any additional VLinks incident to VNode û. If there are additional VLinks incident to VNode û (Y path), then the method advances to step 520. If there are no additional VLinks incident to VNode û (N path), then the method advances to step 540.

At step 540, a possible SNode (l) is selected from a set of SNodes. In step 545, a VLink $(\hat{u},\hat{v})$ is selected incident to VNode û. At step 550, the SLinks used by the mapping of the VLinks belonging to other SRGs are removed. Step 555 is another decision step. It is determined if VNode $\hat{v}$, which is a neighbor node of VNode û, is mapped to a substrate node x. If VNode $\hat{v}$ is mapped to x (Y path), then the method advances to step 560. If VNode $\hat{v}$ is not mapped to x (N path), then the method advances to step 565.

At step 560, the constrained weight shortest path (CWSP) is determined from SNode l to x. In step 565, the CWSP is determined from SNode l to all possible SNode y for VNode v̂ and from all of the determined CWSP that are determined, a CWSP having the minimum cost value is selected. Both of steps 560 and 565 lead to step 570. Step 570 is a further decision step. In step 570, it is determined if there are any additional VLinks incident to VNode û. If there are additional VLinks incident to VNode û (Y path), then the method advances to step 545. If there are no additional VLinks incident to VNode û (No path), then the method advances to step 575.

Step 575 is another decision step. In step 575 it is determined if there are any additional SNodes from the location set. If there are additional SNodes (Y path), then the method advances to step 540. If there are no additional SNodes (N path), the method advances to step 580.

In step 580, VNode û is mapped to the SNode with the least cost and VLink (û,v̂) is mapped to a least cost path if VNode v̂ is already mapped.

Step 585 is another decision step. In step 585 it is determined if there are additional VNode û in the set V. If there are additional VNode û in the set V (Y path), then the method advances to step 515. If there are no additional VNode û in the set V (N path), then the method advances to step 590.

In step 590, the backup path and spare capacity allocation are updated. This substantially corresponds to the function in the pseudocode of FIG. 4C.

The examples of FIGS. 4A, 4B, 4C, 5A and 5B are intended for illustrative purposes. Other embodiments could involve performing the illustrated operations in any of various ways, performing fewer or additional operations, and/or varying the order in which operations are performed. Other variations could be or become apparent to a skilled person based on the present disclosure.

Figure 6:
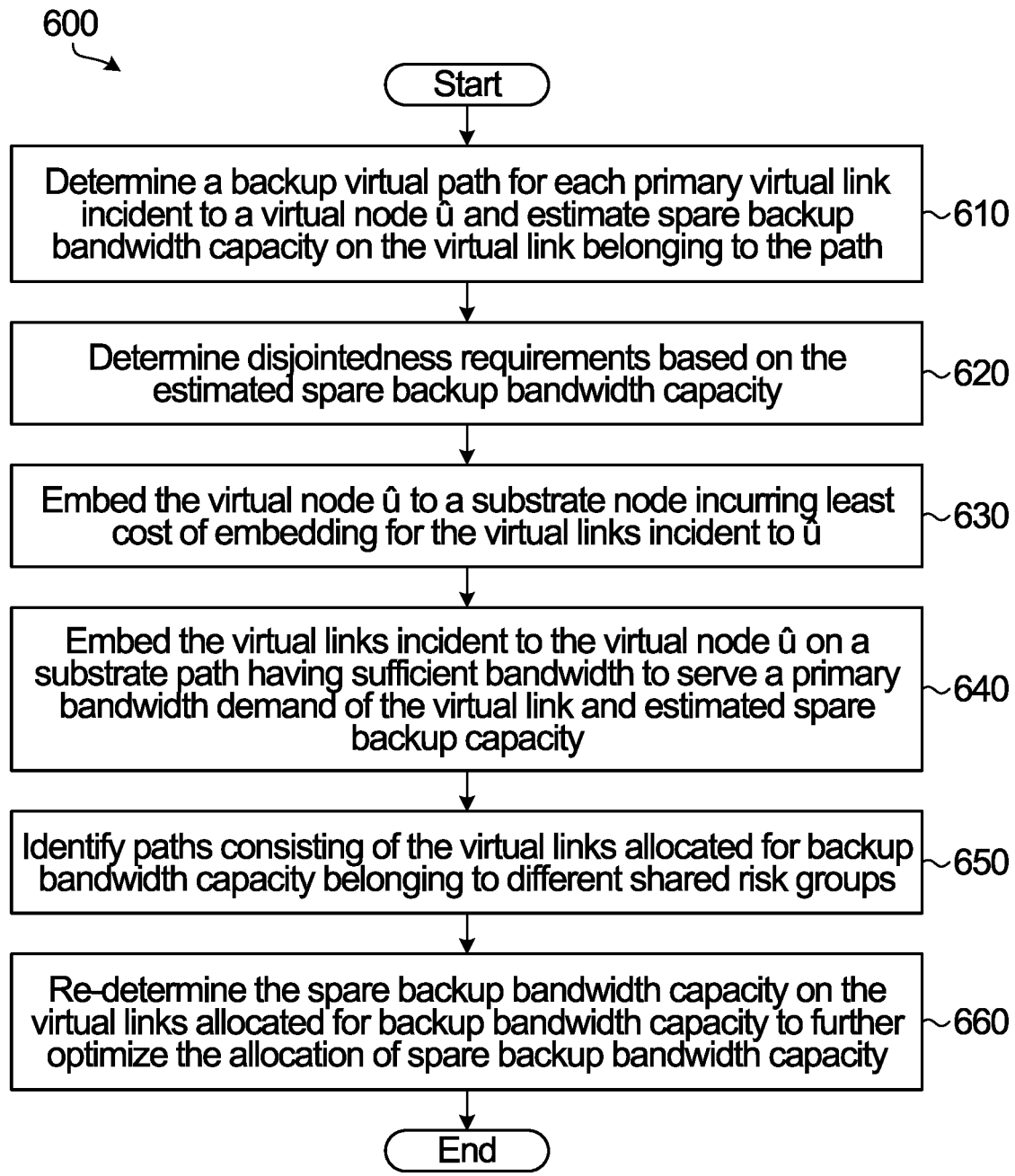
FIG. 6 is a flow diagram of an example method according to an embodiment.

FIG. 6 is a flow diagram of an example method 600 according to an embodiment. Method 600 may be considered a higher level version of what is described above in FIGS. 4A, 4B, 4C, 5A and 5B. The method 600 is for use in network virtualization and involves jointly optimizing provisioning of backup bandwidth capacity for a virtual network and embedding of the virtual network on a substrate network. This method may aid in reducing substrate network resources used for embedding and provisioning backup bandwidth capacity to be used during a failure in the substrate network. As discussed above, the backup bandwidth capacity is being allocated within the virtual network. The method 600 involves performing an initial embedding of the virtual network and finding estimated spare backup bandwidth capacity on virtual links in a virtual network for at least one primary virtual link. Step 610 involves determining a backup virtual path for each primary virtual link incident to a virtual node û and estimating spare backup bandwidth capacity on the virtual link belonging to the virtual path. Step 620 involves determining disjointedness requirements based on the estimated spare backup bandwidth capacity. Step 630 involves embedding the virtual node û to a substrate node incurring a least cost of embedding for the virtual links incident to û. Step 640 involves embedding the virtual links incident to the virtual node û on a substrate path having sufficient bandwidth to serve a primary bandwidth demand of the virtual link and estimated spare backup capacity. After the initial embedding of the virtual network, another step 650 involves identifying paths consisting of the links allocated for backup bandwidth capacity belonging to different shared risk groups. Step 660 involves re-determining the spare backup bandwidth capacity on the virtual links allocated for backup bandwidth capacity to further optimize the allocation of spare backup bandwidth capacity.

The example method 600 is intended for illustrative purposes. Other embodiments could involve performing the illustrated operations in any of various ways, performing fewer or additional operations, and/or varying the order in which operations are performed. Other variations could be or become apparent to a skilled person based on the present disclosure.

The embodiments described with reference to FIGS. 4A, 4B, 4C, 5A, 5B and 6 relate to example methodologies. Apparatus embodiments are also contemplated.

Figure 7:
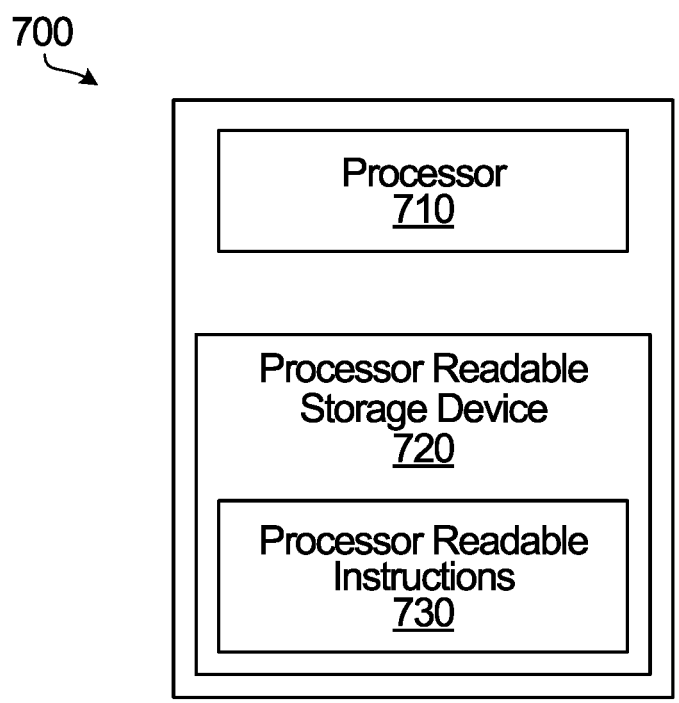
FIG. 7 is a block diagram of an example apparatus according to an aspect of the application.

FIG. 7 is a block diagram of an example apparatus 700 for jointly optimizing backup bandwidth capacity for a virtual network and embedding of the virtual network on a substrate network. The example apparatus 700 includes a processor 710 and a processor readable storage device 720. The processor readable storage device 720 has stored thereon processor executable instructions 730 that when executed by the processor cause the processor to perform a method consistent with the methods described above.

In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which can be, for example, a compact disc read-only memory (CD-ROM), universal serial bus (USB) flash disk, or a removable hard disk.

The device in FIG. 7 may be a network side device or part of a network device. A communication network typically has a network operation center (NOC) that may house dedicated high performance servers that are used for network operation and maintenance (OAM) purposes. A dedicated high performance server may include a processor readable medium having stored thereon processor-executable instructions that are executed by one or many processors. Embodiments of the disclosure described above in terms of network embedding may be a function of such a network controller.

The proposed solutions described above have been evaluated for the joint optimization problem through extensive simulations. The evaluation results focus on the following aspects: (i) impact of SN, (ii) impact of VN, and (iii) scalability of the solutions.

It is noted that an Optimized-ILP (Opt-ILP) solution may be unable to scale beyond very small problem instances. Therefore, a simpler variant of Opt-ILP solution, herein referred to as Max-ILP, was used as a baseline. Opt-ILP places the VLinks in $\mathcal{H}_{ûv̂}$ into separate SRGs whenever possible, thus preferring more sharing of the spare backup capacity. $\mathcal{H}_{ûv̂}$ is the set of VLinks of the VN that contain VLink (û,v̂) in their backup VPaths. Hence, any pair of VLinks in $\mathcal{H}_{ûv̂}$ is constrained to be in separate SRGs during the embedding. In performing the simulation, this allowed the decision variable $d_i^{x̂ŷ}$ from expression (8) to be excluded and reduce complexity. For Max-ILP, expression (8) was modified to take the maximum demand of the VLinks in $\mathcal{H}_{ûv̂}$ as $S_{ûv̂}$.

The proposed solutions were evaluated for both small and large scale settings. For each simulation run, an SN and 5 random VNs were generated with the desired property, for example a number of nodes (size) and a pre-specified link to node ratio (LNR). In small scale, SN size was varied between 20 and 100 nodes, while VN size ranged from 3 to 11 nodes. In large scale, VN size ranged from 10 to 100 nodes on 500 and 1000 node SNs. The connectivity of both SNs and VNs was varied by varying the LNR from 1.0 to 3.0. The VLink demand was set to be 10% of the SLink bandwidth. For each SN, the performance metrics were measured by taking the mean over all 5 VNs. Simulations were performed on a machine with 2×8-core 2.0 Ghz Intel Xeon E5-2650 processors and 256 GB of RAM.

The performance metrics considered were as follows:

1) Cost: The cost of embedding a VN computed using expression (20). A unit cost was set for allocating bandwidth on an SLink, therefore, expression (20) directly represents resource consumption.

2) Execution Time: The time required for an algorithm to find an embedding of a VN.

3) Mean SPath Length: The mean length of the SPath used to embed a VLink of a VN.

4) Mean VPath Length: The mean length of the VPath used as a backup path for a VLink in a VN.

Figure 8A:
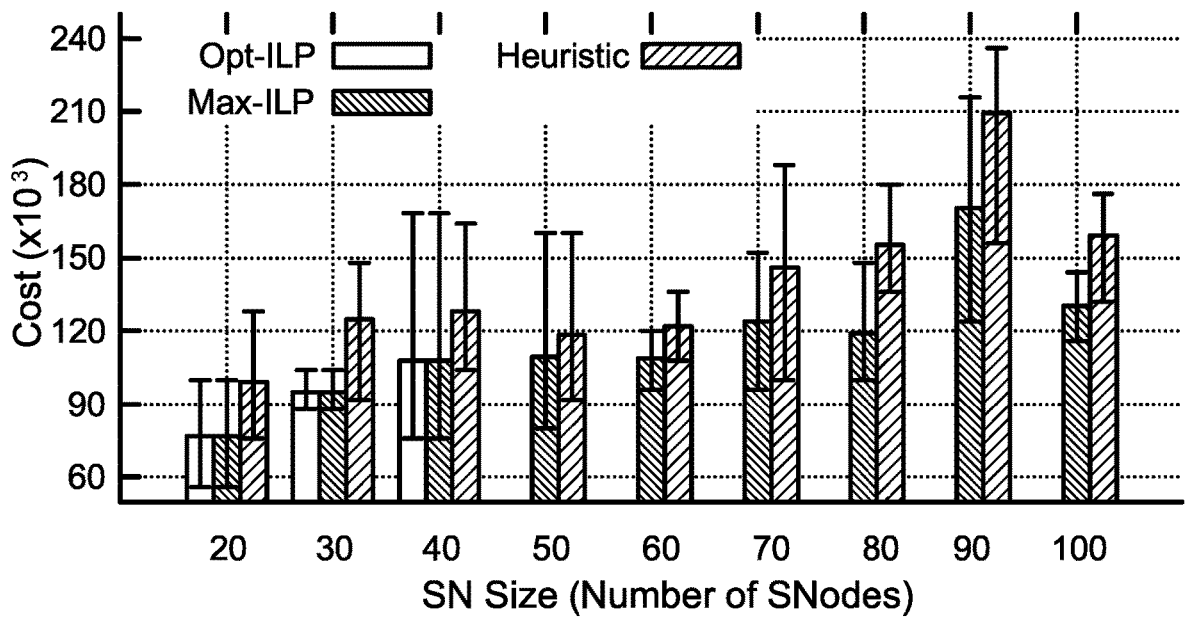
FIGS. 8A, 8B and 8C are graphical plots illustrating the impact of Substrate Network (SN) topology based on simulations utilizing aspects of the application.
Figure 8B:
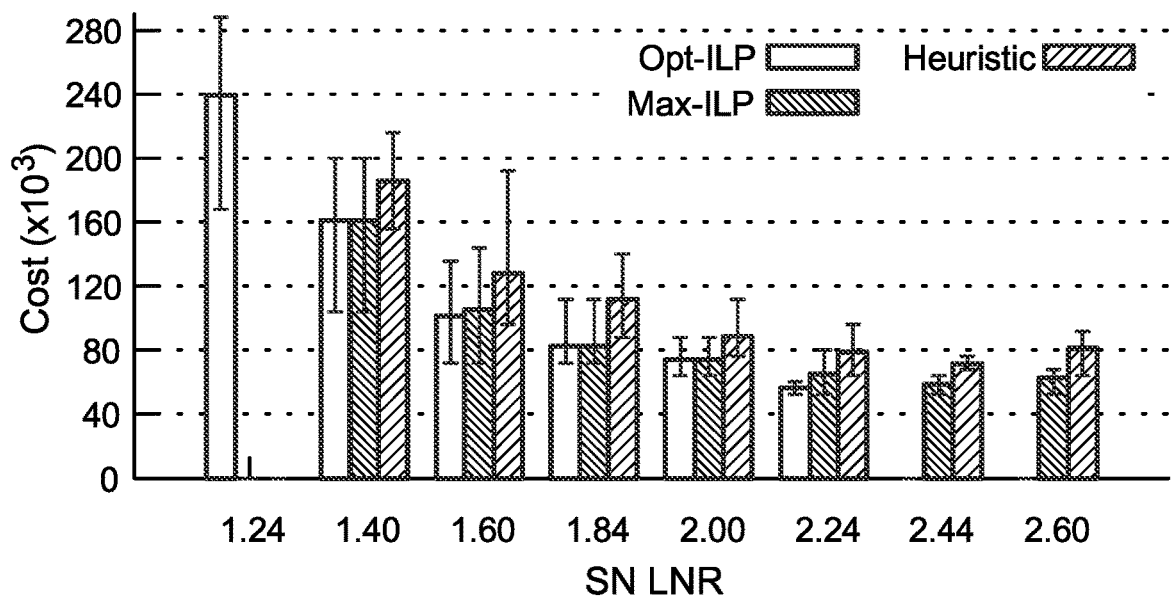
Figure 8C:
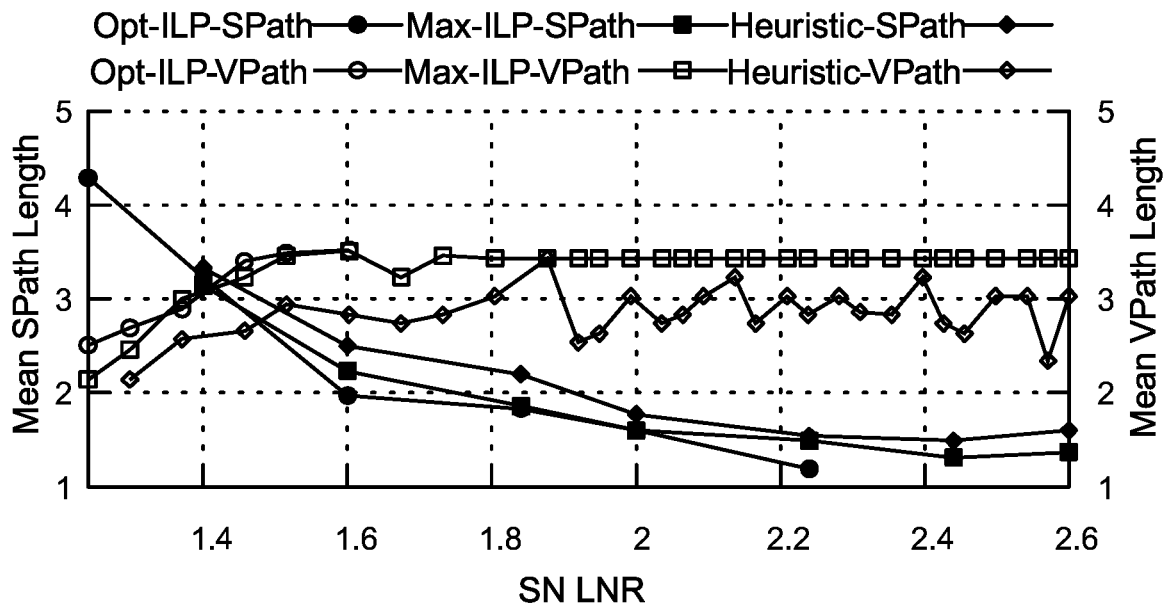

FIG. 8A presents a comparison of embedding cost for different SN sizes, while keeping the VN size and SN LNR fixed at 5 and 1.8, respectively, for three different approaches. The first approach is Opt-ILP, the second approach is Max-ILP and the third approach is a heuristic approach that is consistent with the algorithms in FIGS. 4A, 4B and 4C. In FIG. 8A, the number of substrate nodes is displayed on the x-axis and the cost is displayed on the y-axis. For 20, 30 and 40 SNodes, the costs for all three approaches are shown. For 50 to 100 SNodes, only the Max-ILP and heuristic approaches are plotted. It can be seen that for 20, 30 and 40 SNodes the Max-ILP approach very closely approximates the Opt-ILP approach. Compared to Max-ILP, the heuristic algorithm approach provisions ~25% additional resources on average over all test cases. For a fixed LNR, with increasing SN size, the cost increases for all approaches. This is due to the SPaths becoming longer between the location constraint sets of two VNodes with increasing SN size. However, for a fixed SN size, with increasing SN LNR, costs decrease for all three approaches as observed in FIG. 8B. In FIG. 8B, the substrate node LNR is displayed on the x-axis and the cost is displayed on the y-axis. For an SN LNR of 1.24, the cost for only the Opt-ILP approach is plotted. For an SN LNR of 1.40, 1.60, 1.84, 2.00 and 2.24, the costs for all three approaches are plotted. For an SN LNR of 2.44 and 2.60, the costs for the Max-ILP and heuristic approaches are plotted. This behavior can be explained with the help of FIG. 8C. FIG. 8C presents mean SPath and VPath lengths by varying SN LNR for the three approaches. In FIG. 8C, the substrate node LNR is displayed on the x-axis, mean SPath length is displayed on the left side y-axis and mean VPath length is displayed on the right side y-axis. At the lowest end of the LNR spectrum, approximately 1.2, the Max-ILP and heuristic approaches fail to find sufficient disjoint SPaths, imposed by the SRG constraints, resulting in infeasible solutions. However, the Opt-ILP approach, is able to find a solution with a very high cost, when comparing at the LNR in FIG. 8B, by reducing the number of SRGs. Reducing the number of SRGs is beneficial in the lower LNR value cases, since a disjointed SPath becomes much longer than the corresponding non-disjointed SPath between the same pair of SNodes. As SN LNR increases, the number and the length of the disjointed SPaths increase and decrease, respectively. As a consequence, cost decreases for all three approaches as shown in FIG. 8B. In FIG. 8C, the increase in VPath length with the increase in SN LNR is due to the use of same VLinks by more VPaths leading to more sharing of spare bandwidth. On the contrary, SNs with lower LNRs cannot satisfy the disjointedness constraints imposed by longer VPaths, hence, for all three approaches shorter VPaths are selected resulting in more spare bandwidth and a higher cost (FIG. 8C).

Figure 9A:
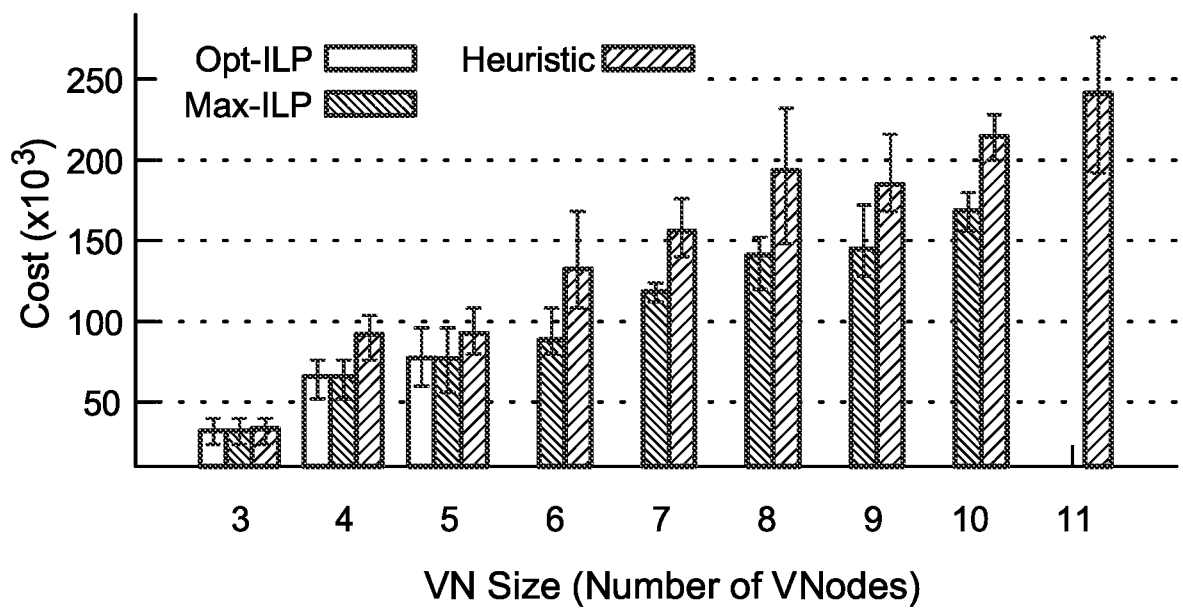
FIGS. 9A, 9B and 9C are graphical plots illustrating the impact of Virtual Network (VN) topology based on simulations utilizing aspects of the application.
Figure 9B:
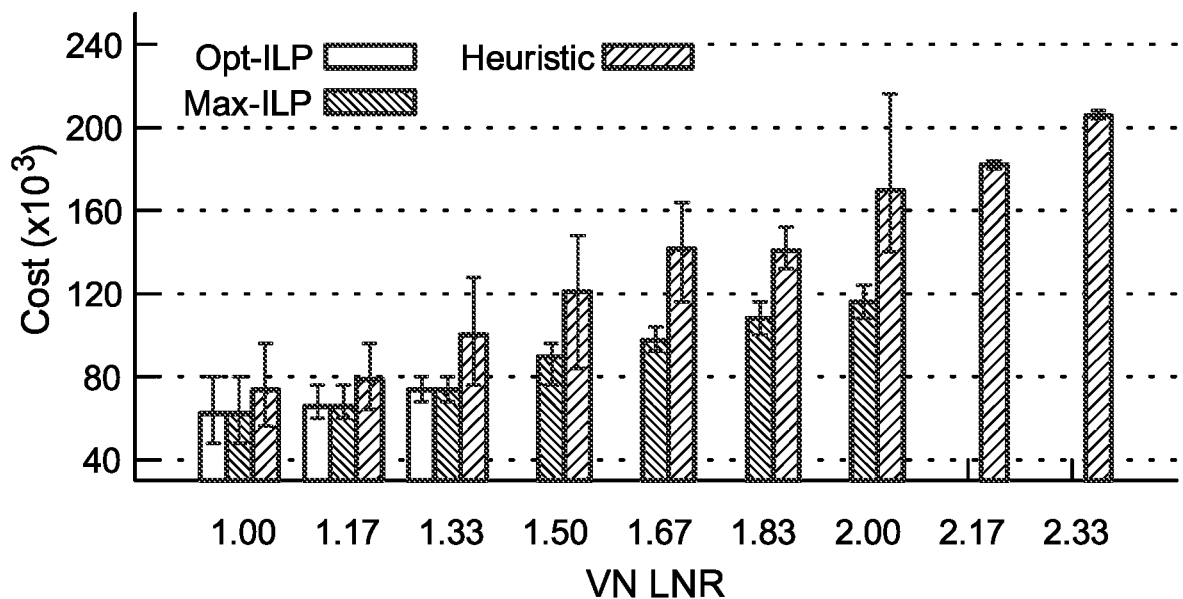
Figure 9C:
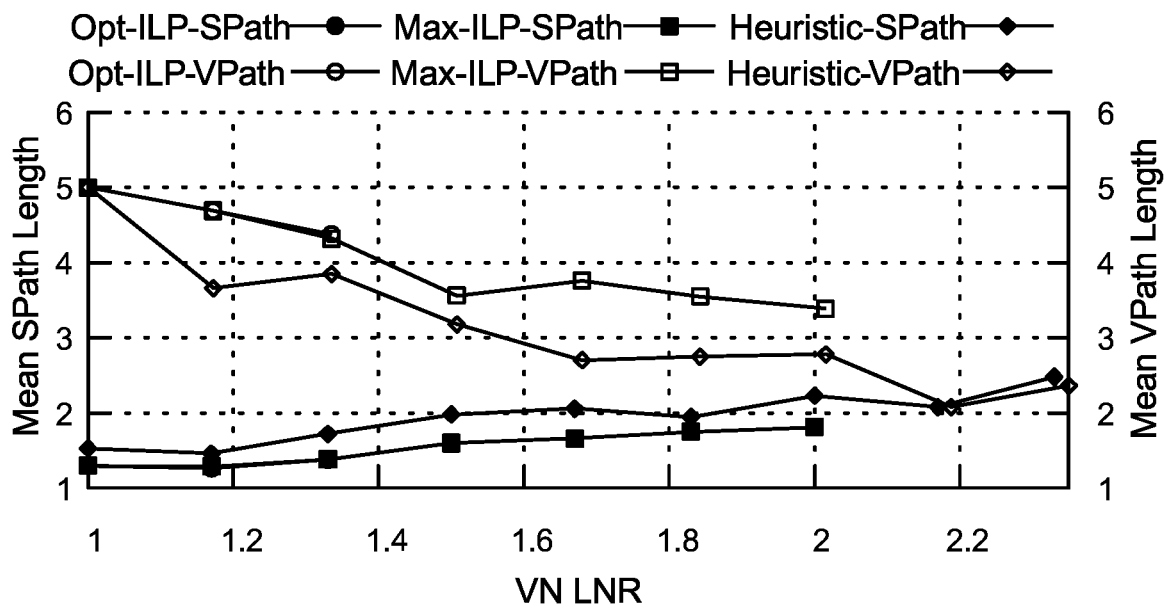

FIG. 9A presents a comparison of embedding costs for different VN sizes, while keeping the SN size, SN LNR, and VN LNR fixed at 50, 1.82, and ~1.4, respectively, for the three approaches. In FIG. 9A, he number of virtual nodes I displayed on the x-axis and the cost is displayed on the y-axis. For 3, 4 and 5 VNodes, the cost for all three approaches are shown. For 6 to 10 VNodes only the Max-ILP and heuristic approaches are plotted. For 11 VNodes, only the heuristic approach is plotted. FIG. 9B and FIG. 9C compare embedding cost, mean SPath and VPath lengths by varying the VN LNR for the three approaches. In FIG. 9B, the substrate node LNR is displayed on the x-axis and the cost is displayed on the y-axis. For a VN LNR of 1.00, 1.17, and 1.33 the cost for all three approaches are plotted. For a VN LNR of 1.50, 1.67, 1.83 and 2.00 the costs for the Max-ILP and heuristic approaches are plotted. For a VN LNR of 2.17 and 2.33 only the heuristic approach is plotted. In FIG. 9C, the virtual node LNR is displayed on the x-axis, mean SPath length is displayed on the left side y-axis and mean VPath length is displayed on the right side y-axis. These figures show that both cost and mean SPath length increase with increasing VN size and VN LNR. This is due to more disjointedness constraints imposed by the higher number of SRGs generated by both larger and denser VNs.

Figure 10A:
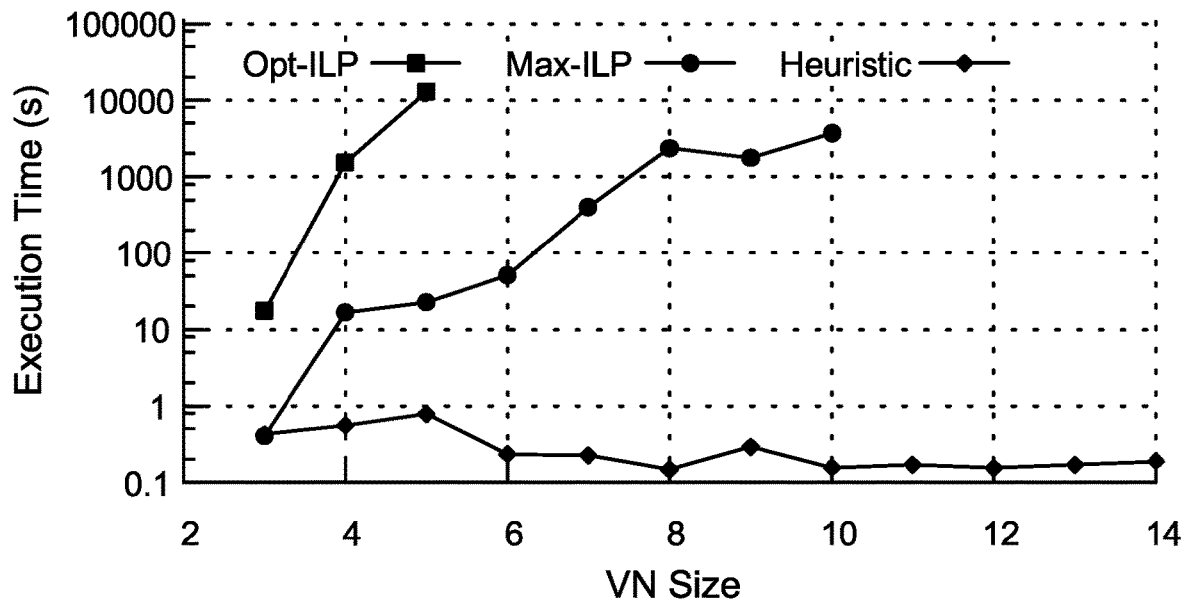
FIGS. 10A, 10B and 10C are graphical plots illustrating the impact of execution time based on simulations utilizing aspects of the application.
Figure 10B:
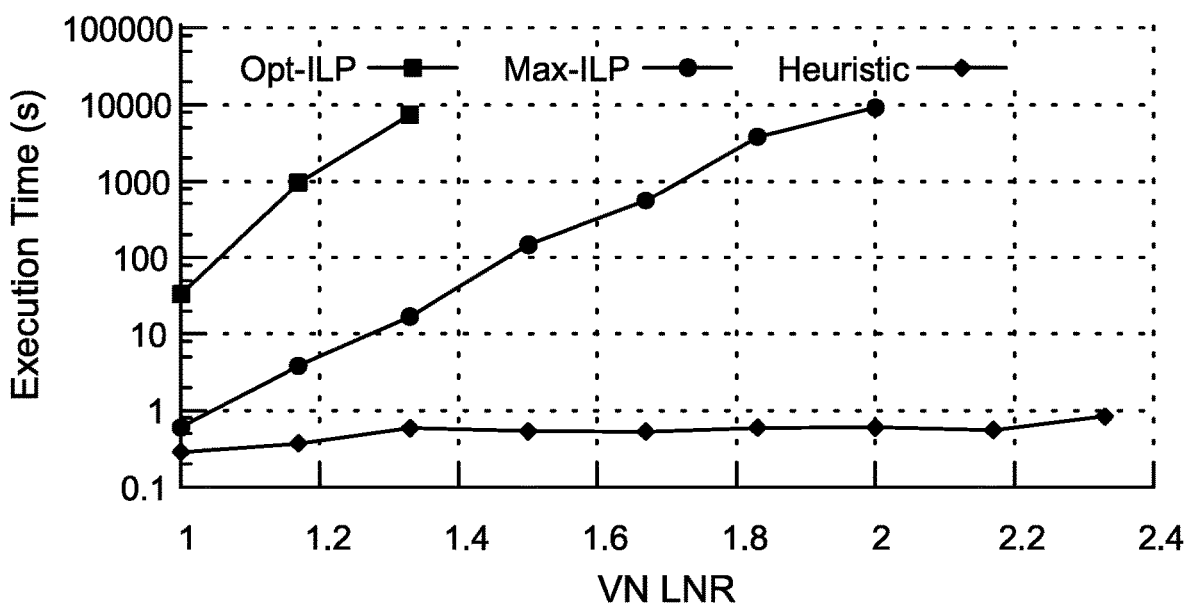
Figure 10C:
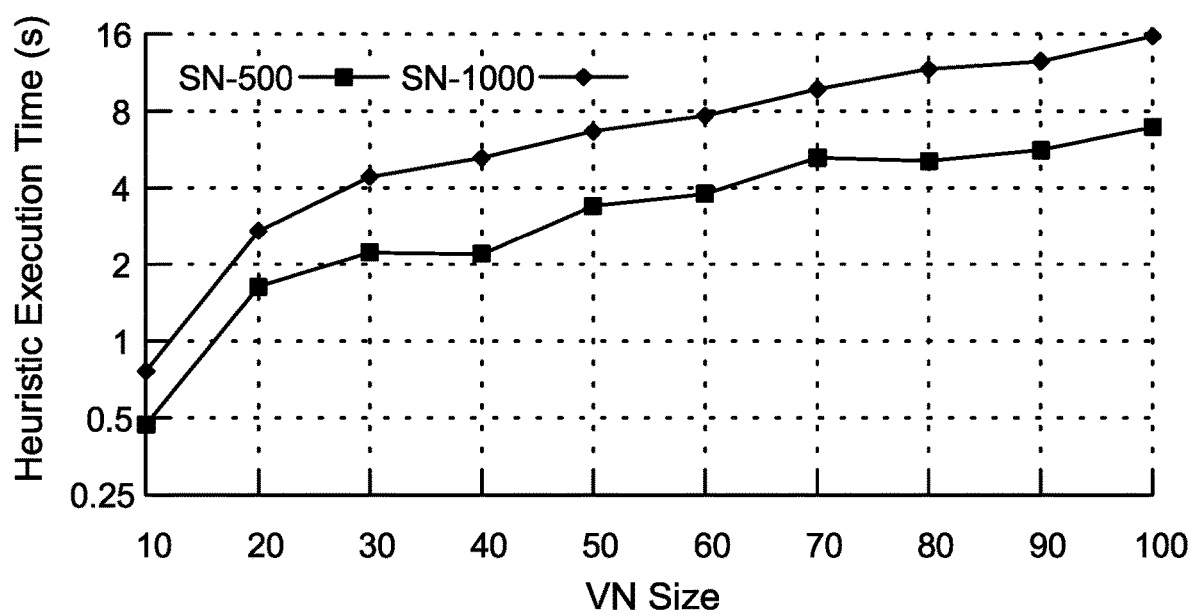

FIGS. 10A, 10B and 10C show the execution times for the three compared approaches to demonstrate the scalability of the different approaches. In FIG. 10A, the number of virtual nodes is displayed on the x-axis and the execution time in seconds is displayed on the y-axis. In FIG. 10B, the virtual node LNR is displayed on the x-axis and the cost is displayed on the y-axis. As problem sizes increase with the increase in VN size, VN LNR, and SN size, the execution times grow for all the approaches except for the case of heuristic execution times against VN size. The decrease in heuristic's execution times with increasing VN size is due to the reduction of the SN solution space imposed by the higher number of SRG constraints. In contrast, the execution times of Opt-ILP and Max-ILP increase exponentially, limiting their scalability to smaller problem instances. As can be seen from FIG. 10A and FIG. 10B, both Opt-ILP and Max-ILP approaches hit an upper limit in terms of VN size or VN LNR. Alternatively, as shown in FIG. 10C, the heuristic algorithm approach can solve much larger scale problem instances, i.e., VNs with 10-100 nodes and 21-285 links on 500 and 1000 node SNs. In FIG. 10C, the number of virtual nodes is displayed on the x-axis and the execution time in seconds is displayed on the y-axis. Two plots correspond to the larger scale instances of 500 and 1000 substrate nodes, respectively. Even for the successful cases, Opt-ILP and Max-ILP require several orders of magnitude more time to solve similar problem instances compared to the heuristic.

In a first example implementation, there is a method for use in network virtualization comprising: jointly optimizing provisioned backup bandwidth capacity for a virtual network and embedding of the virtual network on a substrate network to aid in reducing substrate network resources for backup bandwidth capacity during a failure in the substrate network, the backup bandwidth capacity being allocated within the virtual network; and embedding the virtual network and the backup bandwidth capacity within the virtual network.

According to an embodiment of the first example, optimizing the backup bandwidth capacity for the virtual network and embedding of the virtual network on the substrate network comprises joint optimization by formulating a solution as a Quadratic Integer Program (QIP).

According to an embodiment of the first example, obtaining the jointly optimal solution as the Quadratic Integer Program comprises formulating a solution to minimize:

$$\Sigma_{\forall(\hat{u},\hat{v})\in\hat{E}} \Sigma_{\forall(u,v)\in E} x_{uv}^{\hat{u}\hat{v}} \times C_{uv} \times (b_{\hat{u}\hat{v}}+S_{\hat{u}\hat{v}}).$$

wherein $\hat{u}$ and $\hat{v}$ are virtual nodes in virtual network, u and v are nodes in substrate network, $x_{uv}^{\hat{u}\hat{v}}$ is a mapping between a virtual link VLink($\hat{u},\hat{v}$)$\in\hat{E}$ and a substrate link SLink(u,v)$\in E$, $C_{uv}$ is the cost of allocating unit bandwidth for a VLink in SLink (u,v), $b_{\hat{u}\hat{v}}$ is bandwidth between virtual nodes $\hat{u}$ and $\hat{v}$ and $S_{\hat{u}\hat{v}}$ is the spare bandwidth capacity between virtual nodes $\hat{u}$ and $\hat{v}$.

According to an embodiment of the first example, the method further comprises pre-empting over-commitment of the bandwidth by using a constraint defined by:

$$\forall (u,v)\in E: \Sigma_{\forall(\hat{u},\hat{v})\in\hat{E}} x_{uv}^{\hat{u},\hat{v}} \times (b_{\hat{u}\hat{v}}+S_{\hat{u}\hat{v}}) \leq b_{uv}.$$

According to an embodiment of the first example, formulating the solution as the Quadratic Integer Program further comprises transforming the Quadratic Integer Program to an Integer Linear Program (ILP).

According to an embodiment of the first example, transforming the Quadratic Integer Program to the Integer Linear Program comprises formulating the solution to minimize:

$$\sum_{\forall(\hat{u},\hat{v})\in\hat{E}} \sum_{\forall(u,v)\in E} x_{uv}^{\hat{u}\hat{v}} \times C_{uv} \times b_{\hat{u}\hat{v}} + C_{uv} \times q_{uv}^{\hat{u}\hat{v}}$$

wherein $\hat{u}$ and $\hat{v}$ are virtual nodes in virtual network, u and v are nodes in substrate network, $x_{uv}^{\hat{u}\hat{v}}$ is a mapping between a virtual link VLink($\hat{u},\hat{v}$)$\in\hat{E}$ and a substrate link SLink(u,v)$\in E$, $C_{uv}$ is the cost of allocating unit bandwidth for a VLink for SLink (u,v), $b_{\hat{u}\hat{v}}$ is bandwidth between virtual nodes $\hat{u}$ and $\hat{v}$ and $q_{uv}^{\hat{u}\hat{v}}$ is an integer variable related to the spare bandwidth capacity between virtual nodes $\hat{u}$ and $\hat{v}$.

According to an embodiment of the first example, the method further comprises pre-empting over-commitment of the bandwidth by using a constraint defined by:

$$\forall (u,v)\in E: \Sigma_{\forall(\hat{u},\hat{v})\in\hat{E}} x_{uv}^{\hat{u},\hat{v}} \times b_{\hat{u}\hat{v}} + q_{uv}^{\hat{u}\hat{v}} \leq b_{uv}.$$

According to an embodiment of the first example, jointly optimizing the bandwidth capacity for the virtual network and embedding the virtual network on the substrate network comprises optimizing by obtaining a solution to the joint optimization using a heuristic.

According to an embodiment of the first example, jointly optimizing the backup bandwidth capacity for the virtual network and embedding of the virtual network on the substrate network comprises: for each virtual link between a pair of virtual nodes in the virtual network, allocating spare bandwidth capacity along a non-empty backup virtual path also between the pair of virtual nodes, wherein the backup virtual path that is disjoint from a primary virtual link between the pair of virtual nodes such that the spare bandwidth is available between the pair of virtual nodes when the primary virtual link is affected by a substrate link failure in the substrate network; embedding each virtual node to one substrate node in the substrate network, such that multiple virtual nodes from a same virtual network request are not mapped to a same substrate node; embedding each virtual link onto a non-empty substrate path having sufficient bandwidth to accommodate a virtual link's primary bandwidth demand and backup spare capacity provisioned on the virtual link; and disjointedly embedding the primary virtual link and backup virtual links on the backup virtual path to mitigate an effect of substrate link failure of a single link affecting the primary virtual link and the backup virtual links at a same time.

According to an embodiment of the first example, jointly optimizing the backup bandwidth capacity for the virtual network and embedding of the virtual network on the substrate network comprises: performing an initial embedding of the virtual network and finding estimated spare backup bandwidth capacity on virtual links in the virtual network for at least one primary virtual link by: finding a backup virtual path for each primary virtual link incident to a virtual node $\hat{u}$ and estimating spare backup bandwidth capacity on the virtual link belonging to the path; determining disjointedness requirements based on the estimated spare backup bandwidth capacity; embedding the virtual node $\hat{u}$ to a substrate node incurring least cost of embedding for the virtual links incident to $\hat{u}$; embedding the virtual links incident to the virtual node $\hat{u}$ on a substrate path having sufficient bandwidth to serve a primary bandwidth demand of the virtual link and estimated spare backup capacity; identifying paths consisting of the virtual links allocated for backup bandwidth capacity belonging to different shared risk groups; and re-computing the spare backup bandwidth capacity on the virtual links allocated for backup bandwidth capacity to further optimize the allocation of spare backup bandwidth capacity.

In a second example implementation, there is an apparatus comprising: a processor; and a processor readable storage device, having stored thereon, processor executable instructions that when executed by the processor cause the processor to: jointly optimize provisioned backup bandwidth capacity for a virtual network and embedding of the virtual network on a substrate network to aid in reducing substrate network resources for backup bandwidth capacity during a failure in the substrate network, the backup bandwidth capacity being allocated within the virtual network; embed the virtual network and the backup bandwidth capacity within the virtual network jointly optimizing backup bandwidth capacity for a virtual network and embedding the virtual network on a substrate network, the backup bandwidth capacity being allocated within the virtual network.

According to an embodiment of the second example, optimizing the backup bandwidth capacity for the virtual network and embedding of the virtual network on the substrate network comprises joint optimization by formulating a solution as a Quadratic Integer Program (QIP).

According to an embodiment of the second example, obtaining the jointly optimal solution as a Quadratic Integer Program comprises formulating a solution to minimize the expression:

$$\sum_{\forall(\hat{u},\hat{v})\in\hat{E}} \sum_{\forall(u,v)\in E} x_{uv}^{\hat{u}\hat{v}} \times C_{uv} \times (b_{\hat{u}\hat{v}} + S_{\hat{u}\hat{v}})$$

wherein $\hat{u}$ and $\hat{v}$ are virtual nodes in virtual network, u and v are nodes in substrate network, $x_{uv}^{\hat{u}\hat{v}}$ is a mapping between a virtual link VLink($\hat{u},\hat{v}$)∈$\hat{E}$ and a substrate link SLink(u, v)∈E, $C_{uv}$ is the cost of allocating unit bandwidth for a VLink in SLink (u,v), $b_{\hat{u}\hat{v}}$ is bandwidth between virtual nodes $\hat{u}$ and $\hat{v}$ and $S_{\hat{u}\hat{v}}$ is the spare bandwidth capacity between virtual nodes $\hat{u}$ and $\hat{v}$.

According to an embodiment of the second example, the apparatus further comprises pre-empting over-commitment of the bandwidth by using a constraint defined by:

$$\forall (u,v) \in E : \Sigma_{\forall (\hat{u},\hat{v}) \in \hat{E}} x_{uv}^{\hat{u},\hat{v}} \times (b_{\hat{u},\hat{v}} + S_{\hat{u},\hat{v}}) \leq b_{uv}.$$

According to an embodiment of the second example, formulating the solution as the Quadratic Integer Program further comprises transforming the Quadratic Integer Program to an Integer Linear Program (ILP).

According to an embodiment of the second example, transforming the Quadratic Integer Program to the Integer Linear Program comprises formulating the solution to minimize the expression:

$$\Sigma_{\forall (\hat{u},\hat{v}) \in \hat{E}} \Sigma_{\forall (u,v) \in E} x_{uv}^{\hat{u}\hat{v}} \times C_{uv} \times b_{\hat{u}\hat{v}} + C_{uv} \times q_{uv}^{\hat{u}\hat{v}}.$$

wherein $\hat{u}$ and $\hat{v}$ are virtual nodes in virtual network, u and v are nodes in substrate network, $x_{uv}^{\hat{u}\hat{v}}$ is a mapping between a virtual link VLink($\hat{u},\hat{v}$)∈$\hat{E}$ and a substrate link SLink(u, v)∈E, $C_{uv}$ is the cost of allocating unit bandwidth for a VLink in SLink(u,v), $b_{\hat{u}\hat{v}}$ is bandwidth between virtual nodes $\hat{u}$ and $\hat{v}$ and $q_{uv}^{\hat{u}\hat{v}}$ is an integer variable related to the spare bandwidth capacity between virtual nodes $\hat{u}$ and $\hat{v}$.

According to an embodiment of the second example, the apparatus further comprises pre-empting over-commitment of the bandwidth by using a constraint defined by:

$$\forall (u,v) \in E : \Sigma_{\forall (\hat{u},\hat{v}) \in \hat{E}} x_{uv}^{\hat{u},\hat{v}} \times b_{\hat{u},\hat{v}} + q_{uv}^{\hat{u}\hat{v}} \leq b_{uv}.$$

According to an embodiment of the second example, jointly optimizing the bandwidth capacity for the virtual network and embedding the virtual network on the substrate network comprises jointly optimizing by formulating a solution to the joint optimization using a heuristic.

According to an embodiment of the second example, jointly optimizing the backup bandwidth capacity for the virtual network and embedding the virtual network on the substrate network comprises: for each virtual link between a pair of virtual nodes in the virtual network, allocating spare bandwidth capacity along a non-empty backup virtual path also between the pair of virtual nodes, wherein the backup virtual path is disjoint from a primary virtual link between the pair of virtual nodes such that the spare bandwidth is available between the pair of virtual nodes when the primary virtual link is affected by a substrate link failure in the substrate network; embedding each virtual node to one substrate node in the substrate network, such that multiple virtual nodes from a same virtual network request are not mapped to a same substrate node; embedding each virtual link onto a non-empty substrate path having sufficient bandwidth to accommodate a virtual link's primary bandwidth demand and backup spare capacity provisioned on the virtual link; and disjointedly embedding the primary virtual link and backup virtual links on the backup virtual path to mitigate an effect of substrate link failure of a single link affecting the primary virtual link and the backup virtual links at a same time.

According to an embodiment of the second example, jointly optimizing the backup bandwidth capacity for the virtual network and embedding of the virtual network on the substrate network comprises: performing an initial embedding of the virtual network and finding estimated spare backup bandwidth capacity on virtual links in the virtual network for at least one primary virtual link by: finding a backup virtual path for each primary virtual link incident to a virtual node $\hat{u}$ and estimating spare backup bandwidth capacity on the virtual link belonging to the path; determining disjointedness requirements based on the estimated spare backup bandwidth capacity; embedding the virtual node $\hat{u}$ to a substrate node incurring least cost of embedding for the virtual links incident to $\hat{u}$; embedding the virtual links incident to the virtual node $\hat{u}$ on a substrate path having sufficient bandwidth to serve a primary bandwidth demand of the virtual link and estimated spare backup capacity; identifying paths consisting of the virtual links allocated for backup bandwidth capacity belonging to different shared risk groups; re-computing the spare backup bandwidth capacity on the virtual links allocated for backup bandwidth capacity to further optimize the allocation of spare backup bandwidth capacity.

According to an embodiment of the second example, the apparatus is further configured to receive virtual node descriptions constraints, and physical network descriptions.

In a third example implementation, there is a processor readable storage device, having stored thereon, processor executable instructions that when executed by the processor cause the processor to: jointly optimize provisioned backup bandwidth capacity for a virtual network and embedding of the virtual network on a substrate network to aid in reducing substrate network resources for backup bandwidth capacity during a failure in the substrate network, the backup bandwidth capacity being allocated within the virtual network; and embed the virtual network and the backup bandwidth capacity within the virtual network.

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

We claim:

1. A method for use in network virtualization comprising:

jointly optimizing provisioning of backup bandwidth capacity for a virtual network and embedding of the virtual network on a substrate network to reduce consumption of substrate network resources, the backup bandwidth capacity allocated within the virtual network being used upon occurrence of a failure in the substrate network; and embedding the virtual network and the backup bandwidth capacity within the virtual network.

2. The method of claim 1, wherein the jointly optimizing the provisioning of the backup bandwidth capacity for the virtual network and embedding of the virtual network on the substrate network comprises formulating a joint optimization solution as a Quadratic Integer Program (QIP).

3. The method of claim 2 wherein the formulating the joint optimization solution as the Quadratic Integer Program comprises formulating a solution to minimize:

$$\sum_{\forall(\hat{u},\hat{v})\in\hat{E}} \sum_{\forall(u,v)\in E} x_{uv}^{\hat{u}\hat{v}} \times C_{uv} \times (b_{\hat{u}\hat{v}} + S_{\hat{u}\hat{v}})$$

wherein $\hat{u}$ and $\hat{v}$ are first and second virtual nodes in the virtual network, u and v are first and second nodes in the substrate network, $x_{uv}^{\hat{u}\hat{v}}$ is a mapping between a virtual link VLink($\hat{u}$, $\hat{v}$)∈$\hat{E}$ and a substrate link SLink(u, v)∈E, $\hat{E}$ and E are a set of all virtual links in the virtual network and a set of all substrate links in the substrate network, respectively, $C_{uv}$ is a cost of allocating unit bandwidth for a VLink in SLink (u, v), $b_{\hat{u}\hat{v}}$ is a bandwidth between the first and second virtual nodes $\hat{u}$ and $\hat{v}$ and $S_{\hat{u}\hat{v}}$ is a spare bandwidth capacity between the first and second virtual nodes $\hat{u}$ and $\hat{v}$.

4. The method of claim 3 further comprising pre-empting over-commitment of the bandwidth by using a constraint defined by:

$$\forall (u,v) \in E: \Sigma_{\forall (\hat{u},\hat{v}) \in \hat{E}} x_{uv}^{\hat{u},\hat{v}} \times (b_{\hat{u}\hat{v}} + S_{\hat{u}\hat{v}}) \le b_{uv}.$$

5. The method of claim 2, wherein the formulating the joint optimization solution as the Quadratic Integer Program further comprises transforming the Quadratic Integer Program to an Integer Linear Program (ILP).

6. The method of claim 5 wherein the transforming the Quadratic Integer Program to the Integer Linear Program comprises formulating the solution to minimize:

$$\sum_{\forall (\hat{u},\hat{v}) \in \hat{E}} \sum_{\forall (u,v) \in E} x_{uv}^{\hat{u}\hat{v}} \times C_{uv} \times b_{\hat{u}\hat{v}} + C_{uv} \times q_{uv}^{\hat{u}\hat{v}}$$

wherein $\hat{u}$ and $\hat{v}$ are first and second virtual nodes in the virtual network, u and v are first and second nodes in the substrate network, $x_{uv}^{\hat{u}\hat{v}}$ is a mapping between a virtual link VLink($\hat{u}$, $\hat{v}$)∈$\hat{E}$ and a substrate link SLink(u, v)∈E, $\hat{E}$ and E are a set of all virtual links in the virtual network and a set of all substrate links in the substrate network, respectively, $C_{uv}$ is a cost of allocating unit bandwidth for a VLink for SLink (u, v), $b_{\hat{u}\hat{v}}$ is a bandwidth between the first and second virtual nodes $\hat{u}$ and $\hat{v}$ and $q_{uv}^{\hat{u}\hat{v}}$) is an integer variable related to a spare bandwidth capacity between the first and second virtual nodes $\hat{u}$ and $\hat{v}$.

7. The method of claim 6 further comprising pre-empting over-commitment of the bandwidth by using a constraint defined by:

$$\forall (u,v) \in E: \Sigma_{\forall (\hat{u},\hat{v}) \in \hat{E}} x_{uv}^{\hat{u},\hat{v}} \times b_{\hat{u}\hat{v}} + q_{uv}^{\hat{u}\hat{v}} \le b_{uv}.$$

8. The method of claim 1, wherein the jointly optimizing the provisioning of the backup bandwidth capacity for the virtual network and embedding the virtual network on the substrate network comprises optimizing by obtaining a solution to the joint optimization using a heuristic process.

9. The method of claim 1, wherein the jointly optimizing the provisioning of the backup bandwidth capacity for the virtual network and embedding of the virtual network on the substrate network comprises:

for each virtual link between a pair of virtual nodes in the virtual network, allocating spare bandwidth capacity along a non-empty backup virtual path between the pair of virtual nodes, wherein the non-empty backup virtual path is disjoint from a primary virtual link between the pair of virtual nodes such that the allocated spare bandwidth capacity is available between the pair of virtual nodes when the primary virtual link is affected by a substrate link failure in the substrate network;

embedding each of the pair of virtual nodes to one substrate node in the substrate network, such that multiple virtual nodes from a same virtual network request are not mapped to a same substrate node;

embedding each of the virtual links onto a non-empty substrate path having sufficient bandwidth to accommodate a virtual link's primary bandwidth demand and backup spare capacity provisioned on the virtual link; and disjointedly embedding the primary virtual link and backup virtual links on the backup virtual path to mitigate an effect of substrate link failure of a single link affecting the primary virtual link and the backup virtual links at a same time.

10. The method of claim 1 wherein the jointly optimizing the provisioning of the backup bandwidth capacity for the virtual network and embedding of the virtual network on the substrate network comprises:

performing an initial embedding of the virtual network and finding estimated spare backup bandwidth capacity on virtual links in the virtual network for at least one primary virtual link by:
  determining a backup virtual path for each primary virtual link incident to a virtual node and estimating spare backup bandwidth capacity on the virtual link belonging to the backup virtual path;
  determining disjointedness requirements based on the estimated spare backup bandwidth capacity;
  embedding the virtual node to a substrate node incurring least cost of embedding for the virtual links incident to the virtual node; and
  embedding the virtual links incident to the virtual node on a substrate path having sufficient bandwidth to serve a primary bandwidth demand of the virtual link and the estimated spare backup capacity;
identifying paths consisting of the virtual links allocated for the backup bandwidth capacity belonging to different shared risk groups; and
re-determining the estimated spare backup bandwidth capacity on the virtual links allocated for backup bandwidth capacity to further optimize the allocation of the estimated spare backup bandwidth capacity.

11. An apparatus comprising:
a processor; and
a processor readable storage device, having stored thereon, processor executable instructions that when executed by the processor cause the processor to:
jointly optimize provisioning of backup bandwidth capacity for a virtual network and embedding of the virtual network on a substrate network to reduce consumption of substrate network resources, the backup bandwidth capacity allocated within the virtual network being used upon occurrence of a failure in the substrate network; and
embed the virtual network and the backup bandwidth capacity within the virtual network.

12. The apparatus of claim 11, wherein the jointly optimizing the provisioning of the backup bandwidth capacity for the virtual network and embedding of the virtual network on the substrate network comprises formulating a joint optimization solution as a Quadratic Integer Program (QIP).

13. The apparatus of claim 12 wherein the formulating the joint optimization solution as the Quadratic Integer Program comprises formulating a solution to minimize the expression:

$$\sum_{\forall (\hat{u},\hat{v}) \in \hat{E}} \sum_{\forall (u,v) \in E} x_{uv}^{\hat{u}\hat{v}} \times C_{uv} \times (b_{\hat{u}\hat{v}} + S_{\hat{u}\hat{v}})$$

wherein $\hat{u}$ and $\hat{v}$ are first and second virtual nodes in the virtual network, u and v are first and second nodes in the substrate network, $x_{uv}^{\hat{u}\hat{v}}$ is a mapping between a virtual link VLink($\hat{u}$, $\hat{v}$)∈$\hat{E}$ and a substrate link SLink(u, v)∈E, $\hat{E}$ and E are a set of all virtual links in the virtual network and a set of all substrate links in the substrate network, respectively, $C_{uv}$ is a cost of allocating unit bandwidth for a VLink in SLink (u, v), $b_{\hat{u}\hat{v}}$ is a bandwidth between the first and second virtual nodes $\hat{u}$ and $\hat{v}$ and $S_{\hat{u}\hat{v}}$ is a spare bandwidth capacity between the first and second virtual nodes $\hat{u}$ and $\hat{v}$.

14. The apparatus of claim 13 further comprising pre-empting over-commitment of the bandwidth by using a constraint defined by:

$$\forall (u,v) \in E: \Sigma_{\forall(\hat{u},\hat{v}) \in \hat{E}} x_{uv}^{\hat{u},\hat{v}} \times (b_{\hat{u},\hat{v}} + S_{\hat{u},\hat{v}}) \leq b_{uv}.$$

15. The apparatus of claim 12, wherein the formulating the joint optimization solution as the Quadratic Integer Program further comprises transforming the Quadratic Integer Program to an Integer Linear Program (ILP).

16. The apparatus of claim 15 wherein the transforming the Quadratic Integer Program to the Integer Linear Program comprises formulating the solution to minimize the expression:

$$\sum_{\forall(\hat{u},\hat{v}) \in \hat{E}} \sum_{\forall(u,v) \in E} x_{uv}^{\hat{u}\hat{v}} \times C_{uv} \times b_{\hat{u}\hat{v}} + C_{uv} \times q_{uv}^{\hat{u}\hat{v}}$$

wherein $\hat{u}$ and $\hat{v}$ are first and second virtual nodes in the virtual network, u and v are first and second nodes in the substrate network, $x_{uv}^{\hat{u}\hat{v}}$ is a mapping between a virtual link VLink($\hat{u}$, $\hat{v}$)∈$\hat{E}$ and a substrate link SLink(u, v)∈E, $\hat{E}$ and E are a set of all virtual links in the virtual network and a set of all substrate links in the substrate network, respectively, $C_{uv}$ is a cost of allocating unit bandwidth for a VLink in SLink(u, v), $b_{\hat{u}\hat{v}}$ is a bandwidth between the first and second virtual nodes $\hat{u}$ and $\hat{v}$ and $q_{uv}^{\hat{u}\hat{v}}$ is an integer variable related to a spare bandwidth capacity between the first and second virtual nodes $\hat{u}$ and $\hat{v}$.

17. The apparatus of claim 16 further comprising pre-empting over-commitment of the bandwidth by using a constraint defined by:

$$\forall (u,v) \in E: \Sigma_{\forall(\hat{u},\hat{v}) \in \hat{E}} x_{uv}^{\hat{u},\hat{v}} \times b_{\hat{u},\hat{v}} + q_{uv}^{\hat{u},\hat{v}} \leq b_{uv}.$$

18. The apparatus of claim 11, wherein the jointly optimizing the provisioning of the backup bandwidth capacity for the virtual network and embedding the virtual network on the substrate network comprises jointly optimizing by formulating a solution to the joint optimization using a heuristic process.

19. The apparatus of claim 11, wherein the jointly optimizing the provisioning of the backup bandwidth capacity for the virtual network and embedding the virtual network on the substrate network comprises:
for each virtual link between a pair of virtual nodes in the virtual network, allocating spare bandwidth capacity along a non-empty backup virtual path between the pair of virtual nodes, wherein the non-empty backup virtual path is disjoint from a primary virtual link between the pair of virtual nodes such that the allocated spare bandwidth capacity is available between the pair of virtual nodes when the primary virtual link is affected by a substrate link failure in the substrate network;
embedding each of the pair of virtual nodes to one substrate node in the substrate network, such that multiple virtual nodes from a same virtual network request are not mapped to a same substrate node;
embedding each of the virtual links onto a non-empty substrate path having sufficient bandwidth to accommodate a virtual link's primary bandwidth demand and backup spare capacity provisioned on the virtual link; and
disjointedly embedding the primary virtual link and backup virtual links on the backup virtual path to mitigate an effect of a substrate link failure affecting the primary virtual link and the backup virtual links at the same time.

20. The apparatus of claim 11 wherein the jointly optimizing the provisioning of backup bandwidth capacity for the virtual network and embedding of the virtual network on the substrate network comprises:
performing an initial embedding of the virtual network and finding estimated spare backup bandwidth capacity on virtual links in the virtual network for at least one primary virtual link by:
determining a backup virtual path for each primary virtual link incident to a virtual node $\hat{u}$ and estimating spare backup bandwidth capacity on the virtual link belonging to the backup virtual path;
determining disjointedness requirements based on the estimated spare backup bandwidth capacity;
embedding the virtual node to a substrate node incurring least cost of embedding for the virtual links incident to the virtual node; and
embedding the virtual links incident to the virtual node on a substrate path having sufficient bandwidth to serve a primary bandwidth demand of the virtual link and the estimated spare backup capacity;
identifying paths consisting of the virtual links allocated for the backup bandwidth capacity belonging to different shared risk groups; and
re-determining the estimated spare backup bandwidth capacity on the virtual links allocated for backup bandwidth capacity to further optimize the allocation of the estimated spare backup bandwidth capacity.

21. The apparatus of claim 11 further configured to receive virtual node descriptions constraints, and physical network descriptions.

22. A processor readable storage device, having stored thereon, processor executable instructions that when executed by the processor cause the processor to:
jointly optimize provisioning of backup bandwidth capacity for a virtual network and embedding of the virtual network on a substrate network to reduce substrate network resources, the backup bandwidth capacity allocated within the virtual network being used upon occurrence of a failure in the substrate network; and
embed the virtual network and the backup bandwidth capacity within the virtual network.

* * * * *